United States Patent [19]

Fuderer

[11] 4,375,363

[45] Mar. 1, 1983

[54] SELECTIVE ADSORPTION PROCESS FOR PRODUCTION OF AMMONIA SYNTHESIS GAS MIXTURES

[75] Inventor: Andrija Fuderer, Antwerp, Belgium

[73] Assignee: Union Carbide Corporation, Danbury, Conn.

[21] Appl. No.: 966,586

[22] Filed: Dec. 5, 1978

[51] Int. Cl.³ .......................................... B01D 53/04
[52] U.S. Cl. ........................................ 55/25; 55/62; 55/68; 55/70; 55/75
[58] Field of Search ................... 55/25, 26, 58, 62, 68, 55/70, 75

[56] References Cited

U.S. PATENT DOCUMENTS

| | | | |
|---|---|---|---|
| 1,935,469 | 11/1933 | Ellis | 423/359 X |
| 2,955,909 | 10/1960 | Clarke | 423/359 X |
| 3,176,444 | 4/1965 | Kiyonaga | 55/62 X |
| 3,226,913 | 1/1966 | Avery | 55/25 |
| 3,343,916 | 9/1967 | Cahn et al. | 55/62 X |
| 3,430,418 | 3/1969 | Wagner | 55/25 |
| 3,432,265 | 3/1969 | McCallister et al. | 423/359 X |
| 3,743,699 | 7/1973 | Bogart | 423/359 |
| 3,986,849 | 10/1976 | Fuderer et al. | 55/25 |
| 4,077,779 | 3/1978 | Sircar et al. | 55/25 |
| 4,077,780 | 3/1978 | Doshi | 55/26 |

FOREIGN PATENT DOCUMENTS 898058 6/1962 United Kingdom ................... 55/62

*Primary Examiner*—Robert H. Spitzer
*Attorney, Agent, or Firm*—Alvin H. Fritschler

[57] ABSTRACT

A process for forming a gas mixture containing hydrogen and nitrogen for ammonia synthesis, wherein a feed gas mixture containing hydrogen and adsorbable impurities is separated by selective adsorption of the impurities in each of multiple adsorbent beds and discharge of unadsorbed hydrogen-rich gas.

25 Claims, 15 Drawing Figures

F I G. 2

| ADSORBER | 1 | 2 | 3 | 4 | 5 | 6 | 7 | 8 | 9 | 10 | 11 | 12 | 13 | 14 | 15 | 16 | 17 | 18 | 19 | 20 | TIME UNIT |
|---|---|---|---|---|---|---|---|---|---|---|---|---|---|---|---|---|---|---|---|---|---|
| 1 | E1R | FR | | A | | | E1D | E2D | E3D | E4D | BD | | | | P | E4R | E3R | E2R | E1R | FR | |
| 2 | E3R | E2R | E1R | FR | | A | | | | E1D | E2D | E3D | E4D | BD | | | P | E4R | E3R | E2R | |
| 3 | P | E4R | E3R | E2R | E1R | FR | | A | | | | E1D | E2D | E3D | E4D | BD | | | P | E4R | |
| 4 | | P | | E4R | E3R | E2R | E1R | FR | | A | | | | E1D | E2D | E3D | E4D | BD | | | |
| 5 | BD | | | P | | E4R | E3R | E2R | E1R | FR | | A | | | | E1D | E2D | E3D | E4D | BD | |
| 6 | E3D | E4D | BD | | | P | | E4R | E3R | E2R | E1R | FR | | A | | | | E1D | E2D | E3D | |
| 7 | E1D | E2D | E3D | E4D | BD | | | P | | E4R | E3R | E2R | E1R | FR | | A | | | | E1D | |
| 8 | A | | | | E1D | E2D | E3D | E4D | BD | | | P | | E4R | E3R | E2R | E1R | FR | | | |
| 9 | | | | | | | | | | | | | | | | | | | | A | |
| 10 | | | | | | | | | | | | | | | | | | | | A | |

TIME (minutes) — 13 min. 20 sec.

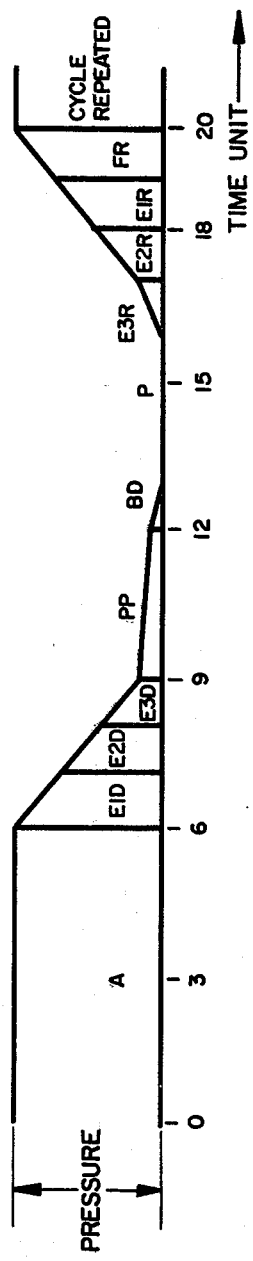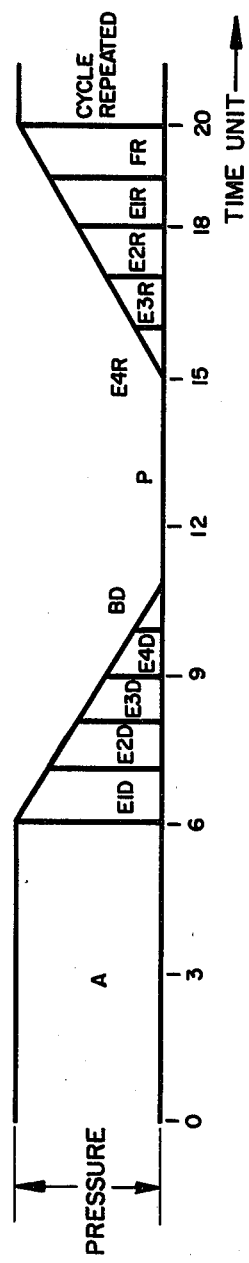

FIG. 5

| Adsorber | 1 | 2 | 3 | 4 | 5 | 6 | 7 | 8 | 9 | 10 | 11 | 12 | 13 | 14 | 15 | 16 | 17 | 18 | TIME UNIT |
|---|---|---|---|---|---|---|---|---|---|---|---|---|---|---|---|---|---|---|---|
| 1 | E1R | FR | | A | | | E1D | E2D | E3D | BDB | | | P | | | E3R | E1R | FR | |
| 2 | E3R | E2R | E1R | FR | | A | | | | E1D | E2D | E3D | BDB | | | P | E3R | E2R | |
| 3 | P | | E3R | E2R | E1R | FR | | A | | | | E1D | E2D | E3D | BDB | | | P | |
| 4 | | P | | | E3R | E2R | E1R | FR | | A | | | | E1D | E2D | E3D | BDB | | |
| 5 | BDB | | | P | | | E3R | E2R | E1R | FR | | A | | | | E1D | E2D | E3D | |
| 6 | E3D | BDB | | | P | | | E3R | E2R | E1R | FR | | A | | | | E1D | E2D | |
| 7 | E1D | E2D | E3D | BDB | | | P | | | E3R | E2R | E1R | FR | | A | | | | |
| 8 | | | E1D | E2D | E3D | BDB | | | P | | | E3R | E2R | E1R | FR | | A | | |
| 9 | A | | | | E1D | E2D | E3D | BDB | | | P | | | E3R | E2R | E1R | FR | A | |

TIME (minutes)

| TIME UNIT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| ADSORBER 1 | EIR | A | FR | | EID | BD | | | EID | P | BD | | EIR | FR | | |
| 2 | | P | | | EIR | A | FR | | | | BD | | EID | P | BD | |
| 3 | | BD | | | | P | | | EIR | A | FR | | | | BD | |
| 4 | EID | | | | | | P | | | FR | | | | A | | |

| ADSORBER | 1 | 2 | 3 | 4 | 5 | 6 | 7 | 8 | 9 | 10 | 11 | 12 | 13 | 14 | 15 | 16 | 17 | 18 | 19 | 20 | TIME UNIT |
|---|---|---|---|---|---|---|---|---|---|---|---|---|---|---|---|---|---|---|---|---|---|
| 1 | A | | | | | | | C | EID | E2D | E3D | BD | | | P | | | E3R | E2R | E1R | FR |
| 2 | E1R | FR | | | A | | | | | | | | | | | | | | E3R | E2R | |
| 3 | E3R | E2R | E1R | FR | | | | A | | | | | | | | | P | | | | |
| 4 | P | | | E3R | E2R | E1R | FR | | | | A | | | | | | | | | P | |
| 5 | | | P | | | | E3R | E2R | E1R | FR | | | | | A | | | | | BD | |
| 6 | E3D | BD | | | P | | | | | E3R | E2R | E1R | FR | | | | C | EID | E2D | E3D | |
| 7 | EID | E2D | E3D | BD | | | P | | | | | E3R | E2R | E1R | FR | | A | | | EID | E2D |
| 8 | C | | | EID | E2D | E3D | BD | | | P | | | | | | A | | | | C | |
| 9 | A | | | | C | | | EID | E2D | E3D | BD | | | P | | | | | A | | |
| 10 | | | | | | | A | | | | | FR | E1R | E2R | E3R | | | P | | A | |

TIME (minutes) → 13 min. 20 sec.

FIG. 9

| Adsorber | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | A | A | A | A | A | A | E1D | E2D | E3D | CBD | BD | P | P | P | E3R | E2R | E1R | FR |
| 2 | E1R | FR | A | A | A | A | A | A | E1D | E2D | E3D | CBD | BD | P | P | P | E3R | E2R |
| 3 | E3R | E2R | E1R | FR | A | A | A | A | A | A | E1D | E2D | E3D | CBD | BD | P | P | P |
| 4 | P | P | P | E3R | E2R | E1R | FR | A | A | A | A | A | A | E1D | E2D | E3D | CBD | BD |
| 5 | BD | P | P | P | E3R | E2R | E1R | FR | A | A | A | A | A | A | E1D | E2D | E3D | CBD |
| 6 | E3D | CBD | BD | P | P | P | E3R | E2R | E1R | FR | A | A | A | A | A | A | E1D | E2D |
| 7 | E1D | E2D | E3D | CBD | BD | P | P | P | E3R | E2R | E1R | FR | A | A | A | A | A | A |
| 8 | A | A | E1D | E2D | E3D | CBD | BD | P | P | P | E3R | E2R | E1R | FR | A | A | A | A |
| 9 | A | A | A | A | E1D | E2D | E3D | CBD | BD | P | P | P | E3R | E2R | E1R | FR | A | A |

TIME UNIT (top axis: 1–18)

TIME (minutes): 1–12

F I G. 12

| Adsorber | 1 | 2 | 3 | 4 | 5 | 6 | 7 | 8 | 9 | 10 | 11 | 12 | 13 | 14 | 15 | 16 | 17 | 18 | TIME UNIT |
|---|---|---|---|---|---|---|---|---|---|---|---|---|---|---|---|---|---|---|---|
| 1 | E1R | FR | A | | | | E1D | E2D | E3D | SBD | BD | SBD | P | E3R | E2R | E1R | FR | | |
| 2 | E3R | E2R | | | | A | | | E1D | E2D | E3D | SBD | BD | P | E3R | E2R | E1R | E2R | |
| 3 | P | E1R | FR | A | | | | | | | | | | | | P | | | |
| 4 | BD | P | E3R | E2R | E1R | FR | A | | | | | | | | | | | | |
| 5 | E3D | SBD | BD | P | E3R | E2R | E1R | FR | A | | | | | | | SBD | BD | SBD | |
| 6 | E2D | E3D | SBD | BD | P | E3R | E2R | E1R | FR | A | | | | | | E2D | E3D | E2D | |
| 7 | E1D | E2D | E3D | SBD | BD | P | E3R | E2R | E1R | FR | A | | | | | | E1D | | |
| 8 | A | | E1D | E2D | E3D | SBD | BD | P | E3R | E2R | E1R | FR | A | | | | | | |
| 9 | A | | | | E1D | E2D | E3D | SBD | BD | P | E3R | E2R | E1R | FR | A | | | | |

TIME (minutes)

SELECTIVE ADSORPTION PROCESS FOR PRODUCTION OF AMMONIA SYNTHESIS GAS MIXTURES

BACKGROUND OF THE INVENTION

1. Field of the Invention

This invention relates to a process for forming a gas mixture containing hydrogen and nitrogen gas for ammonia synthesis, wherein a feed gas mixture containing hydrogen and adsorbable impurities is separated by adiabatic pressure swing adsorption.

2. Description of the Prior Art

In the general practice of forming gas mixtures containing hydrogen and nitrogen for ammonia synthesis, the hydrogen constituent of the synthesis gas mixture may suitably be produced in any of a variety of process steps, such as steam reforming of natural gas or naphtha feedstocks, partial oxidation of hydrocarbon feedstocks, or gasification of coal. Regardless of the type of hydrogen formation method employed, the hydrogen-bearing stream derived from such formation step will typically contain a number of impurities, such as carbon dioxide, carbon monoxide, methane and water. Accordingly the hydrogen-rich gas mixture from the hydrogen-forming step is generally subjected to further treatment steps such as carbon monoxide shift conversion for removal of the carbon monoxide content of the mixture, carbon dioxide removal by selective absorption of carbon dioxide from the gas mixture by a suitable liquid solvent in a wash column, and final purification of the gas mixture by selective adsorption for removal of residual impurities therefrom to yield high purity hydrogen make-up gas. Thereafter the high purity hydrogen gas may be blended with compressed nitrogen from an external source to form the ammonia synthesis gas mixture containing hydrogen and nitrogen in the desired proportion, as for example a stoichiometric 3:1 molar ratio of hydrogen to nitrogen.

In the final purification step in the above-described process, wherein residual impurities are removed from the hydrogen containing make-up gas stream by selective adsorption, adiabatic pressure swing adsorption processes may suitably be employed such as those disclosed in Wagner U.S. Pat. No. 3,430,418 or Fuderer et al. U.S. Pat. No. 3,986,849. The Wagner process employs four adsorbent beds and is capable of yielding 99.9999% hydrogen product gas with no detectable quantities of the aforementioned impurities and at recovery levels on the order of 75–80%. The Fuderer et al process employs at least seven adsorbent beds of which at least two receive feed gas during the process cycle, with at least three pressure equalization stages in the cycle. The Fuderer process is capable of yielding 99.9999% hydrogen product gas at hydrogen recovery levels on the order of 85–90%.

In the above-described adiabatic pressure swing adsorption processes, even though extremely high purity hydrogen product is obtained, a significant amount of the hydrogen contained in the feed gas mixture to the pressure swing process is lost in the waste gas, i.e., countercurrent depressurization gas and purge gas, discharged from the process. Another disadvantage of the prior art pressure swing adsorption processes in such ammonia synthesis gas applications is that they require a relatively high inventory of adsorbent in the adsorbent beds of the process system.

With regard to the overall ammonia synthesis gas production process, using the previously described process steps to produce a high-purity hydrogen gas stream as makeup for the synthesis gas mixture, the nitrogen gas which is blended with the high-purity hydrogen gas to yield the final synthetis gas mixture is typically available from external source means, such as cryogenic or pressure swing adsorption air separation plants, liquid nitrogen vaporization systems and nitrogen gas pipelines, at relatively low pressures, on the order of for example 10–100 psia. Inasmuch as the required pressure of the product synthesis gas mixture is generally higher than 400 psia, substantial compression energy must be expended to compress the low pressure nitrogen to the high pressure levels necessary for formation of the product gas mixture.

Accordingly, it is an object of this invention an improved process for forming a gas mixture containing hydrogen and nitrogen for ammonia synthesis.

It is another object of the invention to provide a process for production of ammonia synthesis gas mixtures which is characterized by higher percent recovery of hydrogen in the final purification pressure swing adsorption step than is realized with prior art processes.

It is another object of this invention to provide a process for producing a synthesis gas mixture for ammonia synthesis which requires less adsorbent material in the pressure swing adsorption step than is required by prior art systems.

It is still another object of this invention to provide a process for producing a synthesis gas mixture of hydrogen and nitrogen wherein the external compression requirement for compressing low pressure make-up nitrogen gas to final product pressure is substantially reduced relative to prior art processes.

Other objects and advantages of this invention will be apparent from the ensuing disclosure and appended claims.

SUMMARY OF THE INVENTION

Briefly, the invention relates to a process for forming a gas mixture containing hydrogen and nitrogen for ammonia synthesis, wherein a feed gas mixture containing hydrogen and adsorbable impurities is separated by selective adsorption of the impurities in each of multiple adsorbent beds by the cycle described below.

In the selective adsorption cycle, feed gas mixture is introduced to the bed inlet end at first highest superatmospheric pressure and unadsorbed hydrogen-rich gas is discharged from the bed discharge end. Initial void space gas is released from the bed discharge end and the so-released initial gas is introduced to the discharge end of another adsorbent bed purged of the impurities and initially at lower pressure until the two beds are pressure equalized at higher intermediate pressure. Additional gas is released from the bed for depressurization thereof to lowest pressure and purge gas is introduced to the bed discharge end for desorption of impurities and purging through the bed inlet end. the purged bed is repressurized to the first highest superatmospheric pressure and thereafter the cycle is repeated.

The improvement of the invention comprises at least one of the following steps:

(a) purging the bed during the purging step with external source nitrogen gas such that at the termination of the purging step nitrogen gas is retained in the bed, compressed in the subsequent purged bed repressuring step to the first highest superatmospheric pressure and thereafter discharged in the unadsorbed hydrogen-rich gas with the discharged gas forming the gas mixture containing hydrogen and nitrogen; and (b) repressurizing the bed during the repressurizing step with external source nitrogen gas such that the introduced nitrogen gas is compressed to the first higher superatmospheric pressure and thereafter discharged in the unadsorbed hydrogen-rich gas, with the discharged gas forming the gas mixture containing hydrogen and nitrogen.

In a preferred embodiment of the invention at least six absorbent beds are provided, with the selective adsorption cycle generally being carried out in a manner similar to that taught by the previously mentioned Fuderer et al. U.S. Pat. No. 3,986,849, as hereinafter described in greater detail.

In accordance with the improvement of the invention, nitrogen is incorporated into the unadsorbed hydrogen-rich gas produced in the selective adsorption step by using external source nitrogen gas as a purging medium or a repressurization medium, or both. This improvement permits the external compression energy requirements for the process system to be substantially reduced relative to prior art systems wherein all of the external source nitrogen gas is externally compressed, i.e., compressed externally of the adsorbent beds, prior to blending thereof with the hydrogen-rich gas product from the adsorbent beds to form the product synthesis gas mixture. By contrast, in the present invention, the external source nitrogen gas is used for purging and/or at least partial repressurization of the adsorbent beds to provide for internal compression thereof within the bed so that same is subsequently discharged, after the bed has been purged and fully repressurized, with the unadsorbed hydrogen-rich gas at high product pressure levels. In such manner, external compression energy requirements for the external source nitrogen purge and/or repressurization gas are substantially reduced or even eliminated. To this end, the external source nitrogen gas is suitably employed in the process at low pressures, i.e., pressures less than the first highest superatmospheric pressure level of the process, on the order of for example 10-100 psia, as taken for example from an air separation plant, pipeline, or liquid nitrogen vaporization system.

In order to obtain an advantageous balance of operating economy and performance efficiency in the preferred practice of the invention, the ratio of the discharged hydrogen-rich gas pressure to the external source nitrogen gas pressure is suitably from 3 to 30.

In the practice of the invention wherein the gas mixture containing hydrogen and nitrogen yielded by the selective adsorption process has a molar ratio of hydrogen to nitrogen greater than 3 and it is necessary or desirable to pass a synthesis gas mixture containing a stoichiometric 3:1 molar ratio of hydrogen:nitrogen to an ammonia synthesis reactor, external source nitrogen gas is externally compressed to the pressure of the unadsorbed hydrogen- and nitrogen-containing gas discharged from the adsorption process and is mixed with the latter to form a product synthesis gas mixture with a hydrogen to nitrogen molar ratio of approximately 3.

Where the gas mixture containing hydrogen and nitrogen yielded by the selective adsorption process is such as to require blending with additional nitrogen make-up gas to attain the requisite proportions of hydrogen and nitrogen, as described above, the ratio of the first highest superatmospheric pressure to the pressure of the purge gas in the purging step is preferably at least 5, so as to achieve a suitable balance of hydrogen recovery from the feed gas mixture in the selective adsorption step and external source nitrogen gas requirements. Based on similar considerations, where the gas mixture yielded by the selective adsorption process contains hydrogen and nitrogen in stoichiometric 3:1 molar ratio, the ratio of the first highest superatmospheric pressure of the process to the pressure of the purge gas is preferably from 4 to 7.

In the practice of the invention wherein the purged bed is partially repressurized during the repressurizing step with external source nitrogen gas, such partial repressurizing step is preferably conducted to provide a terminal intermediate pressure which is from 0.0 to 0.30 times the first highest superatmospheric pressure of the process; such condition permits the use of conventional low pressure nitrogen gas external sources while maintaining external compression requirements for the external source nitrogen gas at suitably low levels for economic operation. For this external source nitrogen gas partial repressurization embodiment of the invention, the ratio of the first highest superatmospheric pressure of the process to the pressure of the purge gas in the purging step is again preferably at least 5, for the reasons discussed hereinabove in connection with such pressure ratio value.

When the invention is carried out with external source nitrogen gas being divided into two portions, with the first portion being employed as purge gas for the purging step and the second portion being externally compressed and thereafter mixed with the discharged hydrogen-rich gas from the selective adsorption process to form a product synthesis gas mixture with a hydrogen to nitrogen molar ratio of approximately 3, the molar ratio of the total first portion nitrogen gas introduced to the adsorbent bed during the purge step to the total second portion low pressure nitrogen gas mixed with the hydrogen-rich gas discharged from the bed is preferably above 0.6 in order to achieve highly efficient and economic operation relative to utilization of the external source nitrogen gas and external compression requirements associated therewith. Also for reasons of operating economy, the total power requirement for the external compression of the second portion nitrogen gas per unit volume of the product synthesis gas mixture produced by the process is preferably from 0.05 to 0.7 KW-hr/Kg-mole synthesis gas mixture.

As used herein, "external source nitrogen gas" means nitrogen gas which derives from a source other than the feed gas mixture introduced to the selective adsorption system. The external source of nitrogen gas may for example comprise a cryogenic or pressure swing adsorption air separation plant, a nitrogen gas pipeline or a cryogenic liquid nitrogen vaporization system.

BRIEF DESCRIPTION OF THE DRAWINGS

FIG. 2 is a cycle chart for the various steps of a selective adsorption cycle carried out in accordance with the process of this invention in the ten bed adsorption zone of FIG. 1.

FIGS. 3a and 3b are pressure-time diagrams comparing the FIGS. 1 and 2 embodiment with a ten bed system of Fuderer et al U.S. Pat. No. 3,986,849.

FIG. 5 is a cycle chart for one embodiment of an adsorption process carried out in accordance with the present invention, such as may suitably be conducted in the FIG. 4 apparatus.

FIG. 7 is a cycle chart for various steps of another embodiment of the adsorption process of the present invention, such as may be performed using the FIG. 6 apparatus.

FIG. 8 is a cycle chart for yet another embodiment of the selective adsorption process of the present invention, such as may be carried out in the FIG. 1 system.

FIG. 9 is a cycle chart for an adsorption process carried out according to another embodiment of the invention, such as may be conducted in the adsorption system shown in FIG. 4.

FIG. 12 is a cycle chart for another adsorption cycle in accordance with the present invention, such as may be conducted in the FIG. 4 adsorption system.

FIG. 13 is a cycle chart for still another adsorption cycle in accordance with the present invention, such as may be conducted in an adsorption system comprising six adsorbent beds.

FIG. 14 is a cycle chart for yet another adsorption cycle in accordance with the present invention, such as may be conducted in an adsorption system comprising ten adsorbent beds.

DESCRIPTION OF THE PREFERRED EMBODIMENTS

Figure 1:
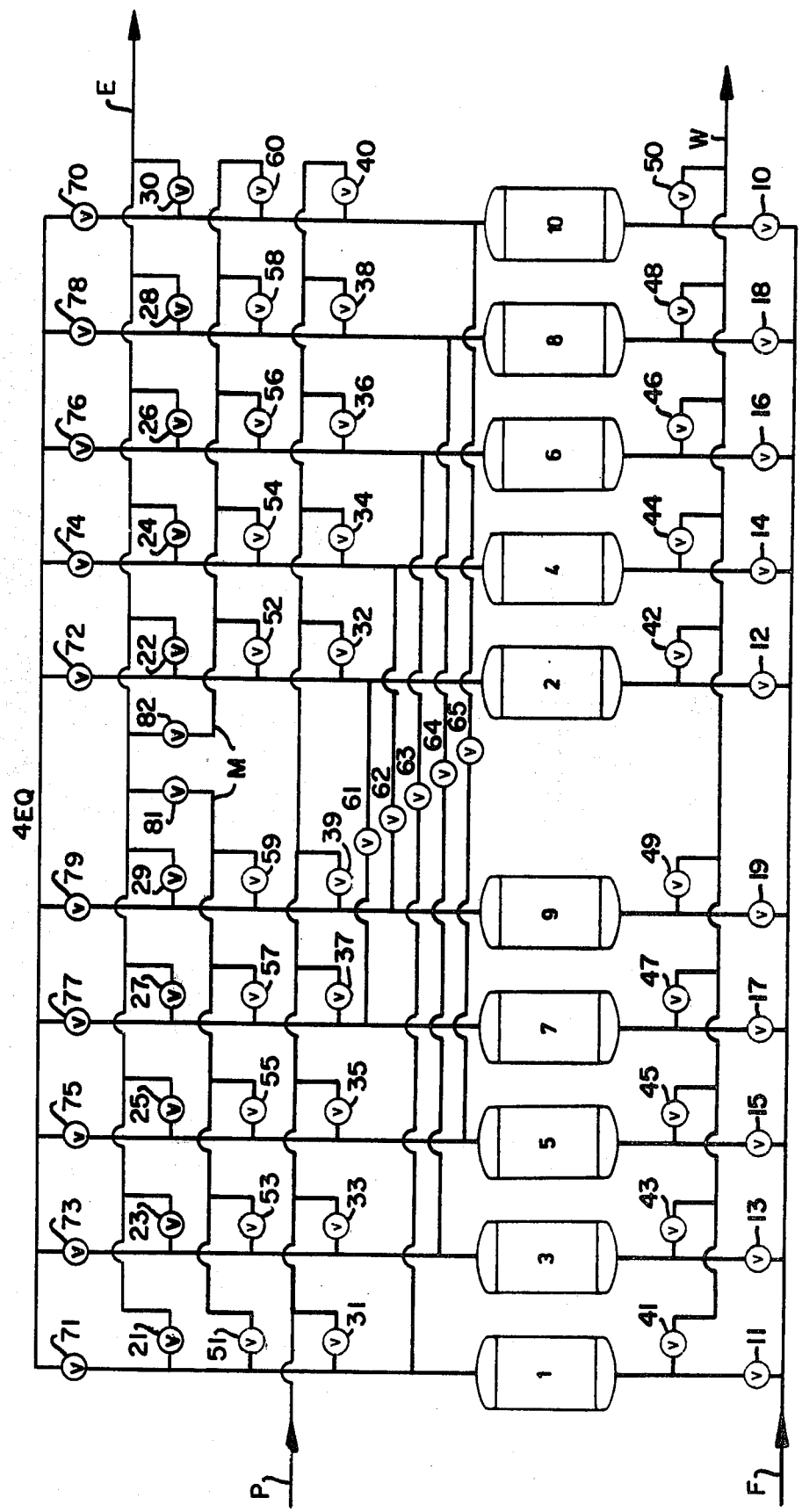
FIG. 1 is a simplified flow sheet of an adsorption zone comprising ten adsorbent beds, such as is suitable for carrying out purification of hydrogen-containing gas in the process of the present invention.

FIG. 1 is a simplified flow sheet of an adsorption zone comprising ten adsorbent beds, such as may be usefully employed in carrying out the process of the present invention. The ten adsorption beds 1–10 are connected in parallel flow relation between the feed gas manifold F having inlet valves 10–19 disposed therein and the unadsorbed product effluent manifold E having product valves 20–29 disposed therein. The selective adsorption system in FIG. 1 is arranged to carry out adiabatic pressure swing adsorption in a manner generally similar to that taught by Fuderer et al. U.S. Pat. No. 3,986,849, incorporated herein to the extent pertinent, but with external source nitrogen gas being employed to purge the various adsorbent beds in the pressure swing adsorption zone in accordance with the present invention. In the prior art Fuderer et al. process, at least seven adsorbent beds are employed, with each adsorbent bed being depressurized during the adsorption cycle in at least three pressure equalization stages, with at least two adsorbent beds receiving gas mixture at any given time during the cycle. The Fuderer et al. process, as modified to use external source nitrogen gas for adsorbent bed purging and/or repressurization, is particularly preferred in the practice of the present invention, inasmuch as it is capable of providing high product gas purity levels and is especially adaptable to feed gas mixtures in which hydrogen is the major component, containing weakly adsorbed impurities such as methane and carbon monoxide, as is encountered in the production of ammonia synthesis gas mixtures.

In the FIG. 1 system, the fourth (lowest) stage pressure equalization manifold (4EQ) is provided with valves 70–79. The waste gas manifold W is provided with waste valves 40–49. The first (highest) stage pressure equalization-repressurization manifolds M are provided with first and third stage equalization valves 50–59. Gas flow regulator valves 81 and 82 are provided in the conduit joining the first stage pressure equalization-repressurization manifold M and the product manifold E. When valve 81 is closed and valve 82 is open, the first pressure equalization step is carried out with beds with even numbers, while the third equalization occurs at the same time between two odd-numbered beds. Conversely, when valve 81 is opened and valve 82 is closed, the first pressure equalization step is carried out between odd-numbered beds, while the third pressure equalization step is concurrently carried out between even-numbered beds.

A common manifold for the second (intermediate) stage manifold is not employed but instead individual conduits are provided to join the discharge ends of adsorbent beds. More specifically, a manifold joins beds 2 and 7 with valve 61 therein, a manifold joins beds 4 and 9 with valve 62 therein, a manifold joins bed 3 and 6 with valves 63 therein, a manifold joins bed 5 and 8 with valve 64 therein, and a manifold joins beds 5 and 10 with valve 65 therein.

For ease in identifying the correspondence between beds 1–10 and valves 11–59 and 70–79, the valves have been assigned identification numbers having a final digit which is the same as the number of the adsorbent bed which is directly controlled by the valves. By way of example, the valves directly controlling the operation of bed 3 are numbered 13, 23, 33, 43, 53 and 73. The only exception to this correspondence are valves directly controlling the operation of bed 10 which are numbered 10, 20, 30, 40, 50 and 70.

FIG. 2 is a preferred cycle diagram for use with the FIG. 1 apparatus to carry out the selective adsorption operation in the present invention according to one embodiment thereof. The sequential steps of the cycle and their designations on the chart are as follows: adsorption (A), first stage pressure equalization-depressurization (E1D), second stage pressure equalization-depressurization (E2D), third stage pressure equalization-depressurization (E3D), fourth stage pressure equalization-depressurization (E4D), countercurrent depressurization (BD), counter-current purge with externally supplied low pressure nitrogen gas purge medium (P), fourth stage pressure equalization-repressurization (E4R), third stage pressure equalization-repressurization (E3R), second pressure equalization-repressurization (E2R), first stage pressure equalization-repressurization (E1R) and final repressurization to the feed gas pressure by product gas introduction at the product discharge end (FR).

It should be noted that any point in the cycle, three adsorbent beds are receiving feed gas mixture and delivering unadsorbed product effluent gas at the feed pressure. By way of example, after four time units, each of adsorbers 2, 3 and 4 is processing feed gas mixture.

In operation of the FIG. 1 apparatus in accordance with the cycle of FIG. 2, each of the adsorbent beds 1–10 in the process system undergoes the following sequence of cycle steps: adsorption wherein feed gas mixture is introduced to the bed inlet end at first highest superatmospheric pressure with discharge of unadsorbed hydrogen-rich gas (including residual nitrogen gas remaining in the bed at the completion of the previously conducted external source nitrogen gas purging step) from the bed discharge end: release of initial void space gas from the bed discharge end and introduction of the so-released initial gas to the discharge end of another adsorbent bed previously purged of the adsorbable impurities and initially at lower pressure until the two beds are pressure equalized at higher intermediate pressure-in this system, the initial void space gas releasing-pressure equalization is performed in four separate stages or phases comprising first pressure equalizing the adsorbent bed having completed its adsorption step with a different previously purged and at least fourth higher numbered bed and initially at intermediate pressure so that the two beds are finally at a first equalization pressure, second pressure equalizing the adsorbent bed initially at the first equalization pressure with a still different previously purged and at least fifth higher numbered bed initially at lower intermediate pressure so that the two beds are finally at a second equalization pressure, third pressure equalizing the adsorbent bed initially at the second equalization pressure with another previously purged and at least sixth higher numbered bed initially at still lower intermediate pressure so that the two beds are finally at a third equalization pressure, and fourth pressure equalizing the adsorbent bed initially at the third equalization pressure with still another previously purged and at least seventh higher numbered bed initially at lowest pressure so that the two beds are finally at fourth equalization pressure; releasing additional gas from the bed for depressurization thereof to lower pressure (countercurrent blowdown); introducing external source low pressure nitrogen purge gas to the bed discharge end for desorption of impurities and purging through the bed inlet end; and repressurizing the purged bed to the first highest superatmospheric pressure in four successive pressure equalization-repressurization steps and with final product gas repressurization, following which the cycle is repeated.

FIGS. 3a and 3b are pressure-time diagrams comparing the FIG. 1–2 embodiment with a ten bed, 3 pressure equalization prior art adsorption process according to Fuderer et al. U.S. Pat. No. 3,986,849.

The pressure-time diagram for the Fuderer et al. 10 adsorbent bed, three pressure equalization cycle is shown in FIG. 3a, while FIG. 3b shows the pressure-time diagram for the selective adsorption process described hereinabove in connection with FIGS. 1–2, wherein external source nitrogen purge gas is employed for purging of the adsorbent bed subsequent to depressurization thereof to lowest pressure. In the FIG. 3a diagram for the prior art process, the adsorbent bed after three successive depressurization-equalization steps provides purge (denoted PP, for providing purge) gas to another adsorbent bed which has previously been depressurized to lowest process pressure. After the providing purge step, the adsorbent bed is countercurrently blown down (depressurized) to lowest process pressure, following which the bed is purged with purge gas from another adsorbent bed undergoing the providing purge depressurization step. After purging, the adsorbent bed is repressurized by three successive pressure equalization steps and finally by repressurization with feed gas mixture (step FR), following which the cycle is repeated.

In the FIG. 3b pressure-time diagram representative of a selective absorption process carried out in accordance with the present invention, the adsorbent bed after the adsorption step is successively depressurized by four separate depressurization-pressure equalization steps, following which the bed is countercurrently blown down to lowest process pressure. The adsorbent bed at lowest process pressure is then purged with external source nitrogen gas. After the purging step, the adsorbent bed is repressurized by four distinct pressure equalization-repressurization steps and a final product gas repressurization step to bring the adsorbent bed to the first highest superatmospheric pressure of the process, following which the cycle is repeated.

By way of comparing FIGS. 3a and 3b, it is to be noted that the void space gas contained in the adsorbent bed after purging in the prior art process of FIG. 3a is essentially hydrogen, while in the process of the present invention, FIG. 3b, the void space gas in the adsorbent bed following the purging step is essentially nitrogen. In both process systems, as the adsorbent bed is subsequently repressured after the purging step, the void space gas contained in the adsorbent bed is compressed to the product gas pressure. Therefore, in the selective adsorption process carried out in accordance with the present invention, as for example in accordance with the cycle represented by FIG. 3b, the unadsorbed product gas discharged from the bed during the adsorption step will contain compressed nitrogen mixed with the hydrogen at high product pressure level. Such internal compression of the nitrogen gas in the adsorbent bed significantly reduces the amount of make-up nitrogen that must be externally compressed for subsequent mixing with the unadsorbed product from the adsorbent bed to form the synthesis gas mixture of hydrogen and nitrogen, and thereby permits a substantial reduction of the power requirement for external nitrogen compression to be realized in the process system.

Relative to the ammonia synthesis production process of the prior art using the selective adsorption process of Fuderer U.S. Pat. No. 3,986,849, the process of the present invention is capable of providing significantly higher hydrogen recovery, lower external nitrogen compression requirements and reduced adsorbent requirements. It is indeed surprising that the external source nitrogen gas purging of adsorbent beds in accordance with the present invention results in increased recovery of hydrogen in the product gas discharged from the adsorption system relative to the prior art process in which internal purging is carried out by flowing impurity-depleted gas from another bed to the bed undergoing purging; contrariwise, based on general considerations, one would expect the hydrogen recovery attainable with external source nitrogen gas purging in the process of the present invention to be substantially reduced relative to the prior art process. This is because in an adsorbent bed having completed the adsorption step, a substantial quantity of unadsorbed hydrogen is contained in the adsorbent bed in the void spaces thereof. This hydrogen-containing void space gas may suitably be employed to repressurize other adsorbent beds in the system by one or more pressure equalization steps, but after the final equalization has been completed there is still a significant quantity of hydrogen remaining in the absorbent bed. In the prior art system (see FIG. 3a), this hydrogen-containing gas in the absorbent bed is utilized for purging another bed—this is the aforementioned providing purge (PP) step. By contrast, in this embodiment of the adsorption process of the present invention, the hydrogen remaining in the adsorbent bed after the final pressure equalization step is removed from the bed during the subsequent countercurrent depressurization (blowdown) and purge steps and is not recovered. There is then essentially no hydrogen in the adsorbent bed at the end of the external source nitrogen gas purge step. Accordingly, it would be expected that recovery of hydrogen would be substantially lower in this embodiment of the process of the present invention than in the prior art process. Surprisingly, however, it has been found that the hydrogen recovery levels attainable in this embodiment of the process of the present invention are actually higher than those achieved using the prior art process wherein internal purging i.e., purging with gas derived from another adsorbent bed, is carried out.

In a preferred embodiment of the invention exemplified by the FIG. 2 cycle chart, at least nine adsorbent beds are provided in overlapping identical cycles such that during the initial portion of a bed adsorption step, the two immediately proceeding lower numbered beds are also on their adsorption steps. During the middle portion of a bed adsorption step, the immediately preceding lower numbered and immediately following higher numbered bed are also on their adsorption steps. During the last period of a bed adsorption step, the two immediately following higher numbered beds are also on their adsorption steps. By way of illustration and referring to FIG. 2, the adsorption step of Bed 1 comprises six time units so that units 1 and 2 represent the initial period and units 5 and 6 are the last period of the adsorption step. During the initial period, Beds 9 and 10 (the two beds immediately preceding Bed 1) are also on their adsorption steps, during the middle period Beds 10 (immediately preceding) and 2 (immediately following) are on their adsorption steps and during the last period Beds 2 and 3 (the two immediately following numbered beds) are also on their adsorption steps.

In another preferred embodiment of the invention, exemplified by the FIGS. 2 and 5 cycle charts, the initial void space gas releasing-pressure equalization is performed in at least three separate phases comprising first pressure equalizing an adsorbent bed having completed its adsorption step with the fourth higher numbered adsorbent bed initially at a second equalization pressure so that the two beds are finally at a first equalization pressure. The same adsorbent bed having been depressurized to the first equalization pressure is now second pressure equalized with the fifth higher numbered adsorbent bed initially at the third equalization pressure so that the two beds are finally at the second equalization pressure. The same adsorbent bed having been depressurized to the second equalization pressure is now third pressure equalized with the sixth higher numbered adsorbent bed initially at the lowest pressure of the process so that these two beds are finally at the third equalization pressure. The same absorbent bed having been depressurized to the third equalization pressure is then further depressurized, either by countercurrent blowdown or a further pressure equalization-depressurization step and countercurrent blowdown, to lowest process pressure at the end of the countercurrent blowdown step. Following the termination of the countercurrent blowdown step wherein the bed is finally depressurized by release of gas from the inlet end of the bed, the bed is purged with external source low pressure nitrogen gas, following which the bed is sequentially repressurized by successive pressure equalization-repressurization steps and a final repressurization step involving flow of first highest superatmospheric pressure product gas into the bed, prior to repetition of the cycle.

Using FIG. 2 to illustrate the relationships between the bed experiencing the initial void space gas releasing step and the other beds being pressure equalized (by repressurization) therewith, the first phase of the Bed 1 initial void space gas releasing (E1D) occurs during time unit 7 and is performed with Bed 5, the fourth higher numbered adsorption bed, during its highest repressurization by pressure equalization phase (E1R). The second phase of the Bed 1 initial void space gas releasing (E2D) occurs during the time unit 8 and is performed with Bed 6, the fifth higher numbered adsorption bed, during its intermediate repressurization by pressure equalization phase (E2R). The third phase of the Bed 1 initial void space gas releasing (E3D) occurs during time unit 9 and is performed with Bed 7, the sixth higher numbered adsorption bed, during its repressurization of pressure equalization phase (E3R). The fourth phase of the Bed 1 initial void space gas releasing (E4D) occurs during time unit 10 and is performed with Bed 8, the seventh higher numbered adsorption bed, during its lowest repressurization of pressure equalization phase (E4R). The final countercurrent depressurization (BD) occurs during time unit 11, followed by purging of Bed 1 during time units 12–15 with external source low pressure nitrogen gas.

It is to be understood that in the aforedefined relationship when the so-calculated higher Bed number exceeds the actual number of adsorbent beds in a particular system, the actual number must be subtracted from the calculated number to identify the designated "higher number adsorbent bed". By way of example, consider the third pressure equalization of Bed 6 which is with the sixth higher numbered adsorbent bed during time unit 19. Since in the FIGS. 1–2 embodiment there are ten adsorbent beds, the designated bed for E3R is 12–10 or Bed 2.

Figure 6:
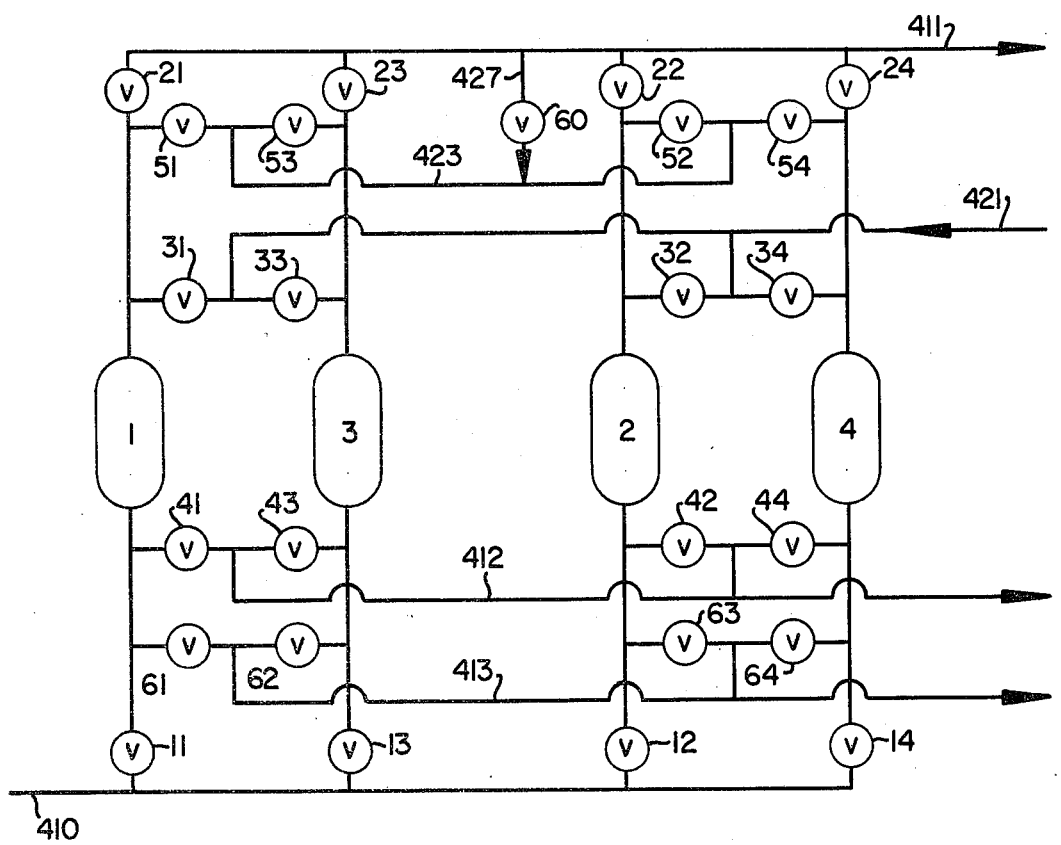
FIG. 6 is a simplified flow sheet of an adsorption system comprising four adsorbent beds which may be used in carrying out the process of the present invention.

FIG. 6 is a simplified flow sheet of an adsorption system such as may be usefully employed in the practice of the present invention. The FIG. 6 apparatus is of a general type as disclosed in Wagner U.S. Pat. No. 3,430,418. This adsorption system employs four adsorbent beds 1, 2, 3 and 4 connected in parallel flow relation between the feed gas mixture manifold 410 and the product effluent gas manifold 411. Automatic valves 11, 12, 13 and 14 direct feed gas flows respectively to bed 1, bed 2, bed 3 and bed 4. Automatic valves 21, 22, 23 and 24 respectively direct product gas from the same beds into the product manifold 411.

The absorbed impurities rejected in the countercurrent depressurization and purging steps are passed out of the system through the waste manifold 412 at the inlet end of the adsorbent beds through values 41, 42, 43 and 44. For pressure equalization using manifold 423 and also for the final repressurization with unadsorbed product gas, using manifolds 427 and 423 values 51, 52, 53 and 54 are employed. The flow rate of gas for the final repressurization step is controlled by valve 60 in line 427.

In the purging step, external source nitrogen purge gas is introduced in conduit 421 through valves 31, 32, 33 and 34, with the purge effluent being discharged from the absorbent beds through valves 41, 42, 43, and 44 to manifold 412. Blowdown (depressurization) gas enters manifold 413, through valves 61, 62, 63 and 64. From manifold 413, the blowdown gas may be recompressed and recycled or it may be partially or completely added to the aforementioned purge effleunt gas.

After adsorbent bed 2 has completed its lowest pressure purge step, valve 31 is closed and pressure equalization valves 51 and 53 are opened. Either simultaneously with or when pressure equalization has been achieved, a portion of the product gas from adsorbent bed 3 in product manifold 411 is diverted consecutively through conduit 427 and valve 60, conduit 423 and thence through valve 51 for flow into the discharge end of adsorber 1. This flow continues until the adsorbent bed 1 has been repressurized to about the product pressure. Feed valve 11 and product valve 21 are, of course, closed throughout repressurization. Repressurization could alternatively be carried out using feed gas mixture as a repressurizing medium, as for example during the final portion of the repressurization step to raise the adsorbent bed to first highest superatmospheric pressure level.

FIG. 7 is a cycle chart for the apparatus of FIG. 6. As shown in the cycle chart, each of the four adsorbent beds in the FIG. 6 system undergoes the sequential steps of adsorption, pressure equalization with another bed, countercurrent depressurization, purging with external source low pressure nitrogen gas, repressurization by pressure equalization with a depressurizing bed in the system and final repressurization with product prior to repetition of the cycle. The system of FIGS. 6 and 7 with four beds is particularly suitable for smaller volume ammonia synthesis gas production facilities, as compared, for example, to the "polybed" systems of FIGS. 1-5.

FIG. 8 shows a cycle chart for selective adsorption carried out in accordance with another embodiment of the present invention. The FIG. 8 cycle chart may usefully be employed in a ten adsorbent bed system of the type generally shown in FIG. 1 herein. The FIG. 8 cycle differs from that shown in FIG. 2 previously described for the FIG. 1 apparatus in that the FIG. 8 cycle employs a cocurrent purge step immediately following the adsorption step and prior to the pressure equalization-depressurization steps. In the intervening cocurrent purge step, an externally supplied purge medium is introduced to the bed at the inlet end thereof, with continued removal of gas from the bed discharge end as product. For this purpose, the cocurrent purge medium is provided at the first highest superatmospheric pressure of the feed, so that the gas discharged from the adsorbent bed during the cocurrent purge step is at the same pressure as the product discharge during the preceeding adsorption step. The purpose of the cocurrent purge step is to displace the void space hydrogen remaining in the adsorbent bed into the hydrogen product-rich gas product manifold.

The externally supplied purge medium employed for the cocurrent purge step in the FIG. 8 process cycle may suitably comprise nitrogen gas or, alternatively, another gas such as methane or natural gas. The specific purging medium to be selected for the cocurrent purge step will depend upon various factors, such as the amount of purge gas required, the quality of the waste gas which is obtained from the pressure swing adsorption unit and the quality of the feed gas mixture which is passed to the pressure swing adsorption unit. The quality of the waste gas obtained from the pressure swing adsorption unit becomes important if it is desired to use the waste gas, i.e., the countercurrent blowdown and purged desorbate gas, as fuel in the process system. As indicated earlier herein, the adsorbable species in the gas mixture separated in the pressure swing adsorption unit for ammonia synthesis may include carbon monoxide and methane, so that the waste gas from the pressure swing adsorption unit will have a moderate heating value and may suitably be used as fuel in the process system. If the heating value of the waste gas from the adsorption system becomes a primary consideration, then it may be desirable to use a fluid such as natural gas as the cocurrent purge medium. In this connection, the quality of the feed gas mixture which is introduced through the adsorption system is important, since if the feed gas mixture contains large amounts of carbon dioxide, the fuel quality of the waste gas would be unacceptable if nitrogen were used as the cocurrent purge medium. This is due to the fact that the cocurrent purge gas will occupy a large portion of the void space within the adsorbent bed at the end of the cocurrent depressurizing-pressure equalization steps, so that cocurrent purged gas will be removed with desorbate impurities in the waste gas. Thus, in such case, where the quality of the waste gas as fuel is a primary concern, a purge medium such as natural gas is preferable.

In the FIG. 8 cycle, as mentioned, the cocurrent purge step is interposed between the adsorption and successive pressure equalization steps. Accordingly, each adsorbent bed in the process undergoes the sequential steps of adsorption, cocurrent purge, three successive pressure equalization depressurizing steps, countercurrent blowdown to lowest process pressure, purging with external source low pressure nitrogen gas, three successive pressure equalization repressurization steps and final repressurization using unabsorbed product hydrogen-rich gas. In this cycle, as in the FIG. 2 cycle, feed gas mixture is simultaneously introduced to three beds in the adsorption system at any given time during the cycle.

FIG. 9 is a cycle chart for another cycle which may be carried out in the process of the present invention. The FIG. 9 cycle may suitably be conducted in an adsorption system, similar to that shown and earlier described in connection with FIG. 7. In this alternative cycle, a cocurrent depressurizing step (CBD) is employed after the third pressure equalization-depressurization step and before the countercurrent depressurization (blowdown) step. In this cycle, the cocurrent depressurization effluent is compressed and added to the absorption step unabsorbed hydrogen-rich product gas to become part of the total hydrogen-rich gas effluent from the pressure swing adsorption system. Thus, in this cycle, each bed undergoes the successive steps of adsorption, three successive pressure equalization-depressurization steps, cocurrent depressurization, countercurrent depressurization (blowdown), purging with external source low pressure nitrogen gas, repressurization by three successive pressure equalization-repressurization steps and final repressurization with product gas prior to reinitiation of the process cycle. An alternative to this cycle is to eliminate the third equalization step therefrom.

Figure 10:
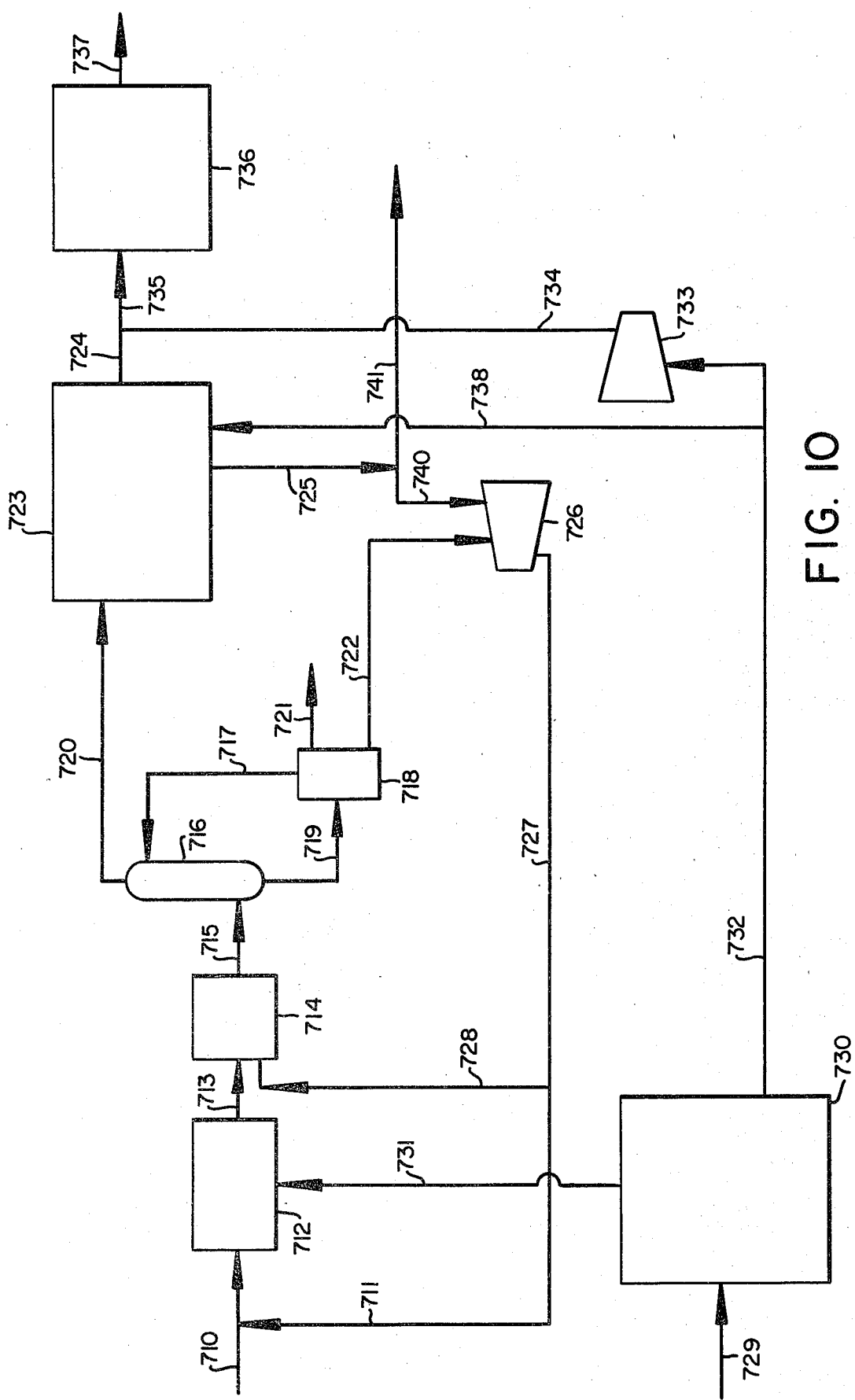
FIG. 10 is a simplified flow sheet of a process system for producing a hydrogen/nitrogen synthesis gas mixture, with recirculation of countercurrent blowdown effluent to the carbon monoxide shift converter.

FIG. 10 shows a simplified flow sheet for an ammonia synthesis gas product process system. A methane-containing gas feedstock is introduced to the process in line 710 for partial oxidation in catalytic reactor 712 to yield a hydrogen-bearing gas mixture effluent from the partial oxidation unit in line 713. Nonetheless, it is to be recognized that a hydrogen-bearing gas mixture could alternatively be formed by steam reforming or by partial oxidation of other hydrocarbons or, alternatively, a hydrogen-bearing gas could be introduced directly to the process, as for example by introduction of coke oven gas, the gas effluent from a coal gasification process, refinery tail gases, pyrolyzed hydrocarbon streams, or electrolytically formed hydrogen gas, thus obviating the need for an initial hydrogen gas forming step in the process system as illustrated. Oxygen gas for the partial oxidation reaction in partial oxidation complex 712 is provided by a cryogenic air separation plant 730. This air separation plant may be of any suitable conventional type, using process and apparatus for separating air as for example are disclosed in Yendall U.S. Pat. No. 3,824,428; First et al. U.S. Pat. No. 2,908,144; Simpson U.S. Pat. No. 2,547,277; Kornemann et al. U.S. Pat. No. 3,246,478; or Coveney et al. U.S. Pat. No. 3,905,201. Atmospheric air is introduced into the cryogenic air separation plant 730 in line 729 for separation into oxygen gas, which is passed to the partial oxidation complex 712 in line 731 and low pressure nitrogen gas, which is discharged from the air separation plant in line 232.

From line 713, the partial oxidation product gas mixture is passed to the carbon monoxide shift converter 714 for catalytic reaction of at least a major portion of the carbon monoxide therein with water to yield hydrogen and carbon dioxide and form a further reaction product gas mixture containing hydrogen, carbon dioxide and residual carbon monoxide, discharged from the carbon monoxide shift converter in line 715; this gas mixture is then introduced to a lower portion of the absorber column 716 for gas-liquid contacting therein of the ascending further reaction product gas mixture against descending liquid solvent such as for example propylene carbonate, ethanol amines or potassium carbonate, introduced to an upper portion of the column in line 717. In column 716, at least a major portion of the carbon dioxide in the further reaction product gas mixture is removed by selective absorption to yield a feed gas mixture containing hydrogen and adsorbable impurities including residual carbon monoxide and carbon dioxide, discharged as overhead gas from column 716 in line 720. The feed gas mixture in line 720 is thereupon introduced to the adiabatic pressure swing adsorption unit 723 for separation therein by selective adsorption of the impurities in each of the multiple adsorbent beds, as hereinearlier described. Unadsorbed hydrogen-rich product gas is discharged from the pressure swing adsorption unit 723 in line 724. Waste gas is discharged from the pressure swing adsorption unit 723 in line 725 and may suitably be used as fuel gas in the process system, as discharged in line 741.

Returning to the selective adsorption complex including absorber column 716, the bottoms from column 716 constituted by impurity-enriched solvent is introduced from line 719 to solvent regeneration complex 718, wherein the impurity-enriched solvent is freed of the absorbed impurities and recycled to the absorber column in line 717. In the solvent regeneration complex 718, which may suitably be of any conventional type well known to those skilled in the art, previously absorbed carbon dioxide is separated from the solvent and discharged from the complex 718 in line 721.

The regeneration treatment of the impurity-laden solvent in the regeneration complex includes a flashing operation which results in the liberation of an impurity gas mixture discharged from the complex in line 722, and therefrom to compressor 726 along with the aforementioned waste gas from the pressure swing adsorption complex in line 740 as desired. Subsequent to compression, these constituent gas streams are discharged from the compressor 726 in line 727 as recycle gas. From line 727, the recycle gas is split, with a first portion being passed in line 728 to the carbon monoxide shift converter 714, for enhancement of production and recovery of hydrogen in the process, and the remainder of the recycle gas being passed in line 711 to influent feed line 710 for joining with the methane-containing feed stock and enhancement of the production and recovery of hydrogen in the overall process.

In the FIG. 10 system, a first portion of low pressure nitrogen gas from the cryogenic air separation plant external source 730 is employed as purge gas for the adsorbent beds in the pressure swing adsorption complex 723, the purge gas being diverted to the pressure swing adsorption complex in line 738 from line 732, with a remaining second portion of the low pressure nitrogen gas being compressed in compressor 733 and discharged at high pressure into line 734 for subsequent mixing with the hydrogen-rich product gas from the pressure swing adsorption unit in line 724 to form the synthesis gas mixture in line 735. Reaction in reactor 736 forms ammonia that exits therefrom through line 737. This embodiment of the present invention features the use of a portion of the low pressure external source nitrogen gas as a purging medium for the adsorbent beds in the pressure swing adsorption zone. In this embodiment, the low pressure external source nitrogen gas is used to purge the previously adsorbed impurities from the adsorbent beds, such that nitrogen gas is retained in the beds after the conclusion of the purging step. Subsequently, when the adsorbent bed is repressurized to high pressure and the adsorption step commenced, the nitrogen is discharged with unadsorbed hydrogen-rich gas in the product stream discharged from the pressure swing adsorption process. In this manner, low pressure nitrogen gas purging medium is internally compressed in the adsorbent beds of the pressure swing adsorption system, and the amount of external compression, i.e., compression outside of the adsorbent beds, of external source low pressure nitrogen gas is substantially reduced relative to prior art process systems. Apart from permitting a substantial reduction in the amount of external source nitrogen gas compression energy to be realized, this embodiment of the invention has unexpectedly been found to result in substantial improvement in overall recovery of hydrogen in the process, as mentioned hereinearlier.

In the FIG. 10 system, the purge and countercurrent blowdown effluent are discharged from the pressure swing absorption unit 723 in line 740 and compressed by compressor 726 along with the flash gas from the regeneration unit 718 in line 722 to form the compressed recycle gas discharged from compressor 726 in line 727. The recycle gas may suitably be recirculated in its entirety in line 728 to the carbon monoxide shift converter 714 or, alternatively, a portion of the recycle gas may be recirculated in line 711 for joining with the methane or other hydrocarbon feedstock being introduced to the process system in line 710. The choice of the specific recirculation scheme to be employed in connection with the recycle gas will depend on the relative methane and carbon monoxide quantities therein, as will be apparent to those skilled in the art. In this process scheme, the purged gas effluent from the pressure swing adsorption unit 723 may be discharged in line 725 and passed out of the process system in line 741; alternatively, a portion thereof may be diverted in line 740 for introduction to compressor 726 at the lowest stage suction pressure. Such diversion of a portion of the purged gas may be desirable in certain applications to take advantage of the methane and carbon monoxide content of the purged gas discharged from the adsorption system in line 725. In this embodiment, a first portion of low pressure nitrogen gas from the cryogenic air separation plant external source 730 is passed to the adsorption system in line 738, with the remaining second portion thereof being externally compressed in compressor 733 and thereafter flowed in line 734 for mixing with the discharged hydrogen-rich gas in line 724 to yield a synthesis gas mixture in line 735 containing hydrogen and nitrogen in approximate 3:1 molar ratio for ammonia synthesis.

Figure 11:
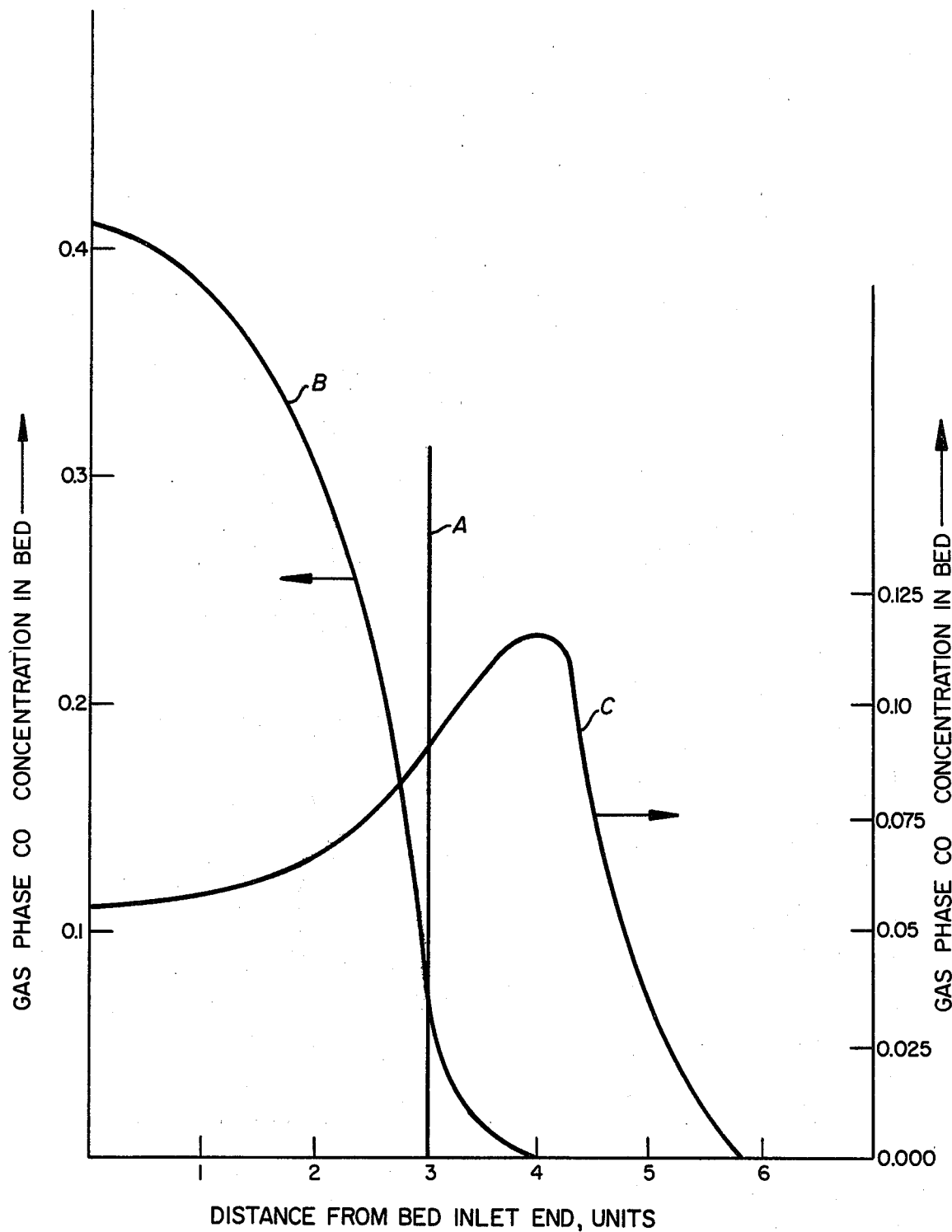
FIG. 11 is a graph of the gas phase concentration profiles in an adsorber bed carrying out the selective adsorption process of the present invention, plotted as functions of distance from the bed inlet end, at the conclusion of the bed pressure equalization steps.

FIG. 11 is a graph of gas phase concentration profiles for carbon monoxide and carbon dioxide in an adsorbent bed carrying out selective adsorption in accordance with the present invention, wherein the gas phase concentrations of carbon monoxide and carbon dioxide are plotted as functions of the distance along the major axis of the adsorbent bed from the bed inlet end. The gas phase concentration profiles shown in FIG. 11 are in general representative of the process of the instant invention, and are based specifically on the embodiment of the present invention shown and described in connection with FIGS. 1–2 herein. The concentration profiles illustrated include curve B, for the carbon dioxide component of the absorbable impurities and curve C for the carbon monoxide component thereof. These curves represent the gas phase concentration profiles in the adsorbent bed at the termination of the sequential pressure equalization steps, just prior to countercurrent depressurization (blowdown) of the adsorbent bed. These curves show that there is a portion of the adsorbent bed nearer the discharge end of the bed that is richer in void space carbon monoxide content than the portion of the bed nearer the inlet end thereof. If the adsorbent bed is divided into two parts, with the line of demarcation being located at about one-half of the bed length from the bed inlet end as shown by line A, the upstream feed inlet part contains almost all of the carbon dioxide contained in the bed and the discharge portion downstream of the dividing line contains carbon monoxide in the void space gas with a comparatively small concentration of carbon dioxide.

It has been found that if the bed having gas phase concentration profiles as shown in FIG. 11 is depressurized by discharging gas from the adsorbent bed at a point intermediate the inlet and discharge ends of the bed, at a point proximate or coincident with line A in FIG. 11, that the following advantages are achieved: (a) the discharge end portion of the adsorbent bed is depressurized countercurrently, which serves to assist in maintaining a low impurity concentration at the discharge end of the bed, (b) the inlet end portion of the adsorbent bed is depressurized cocurrently which assists in displacing a maximum amount of hydrogen component from the inlet end of the adsorbent bed and (c) a significant portion of the carbon monoxide present in the void space gas in the adsorbent bed can be recovered together with hydrogen in the side stream depressurization gas. Since the side stream depressurization gas containing a significant portion of carbon monoxide can be recycled to the carbon monoxide shift converter of the process system wherein more hydrogen may be formed from the recirculated carbon monoxide, it is possible in this manner to enhance the recovery of hydrogen compared to depressurization of the entire adsorbent bed to lowest pressure by countercurrent blowdown. In addition, the quantities of carbon dioxide and methane will be substantially reduced in the side stream depressurization gas compared to countercurrent depressurization effluent from the adsorbent bed. Thus, side stream depressurization of the adsorbent bed to lowest pressure is preferred to decrease the load on the recycle gas compressor and the carbon monoxide shift converter relative to a process wherein countercurrent blowdown effluent is compressed and recirculated in the recycle gas to the shift converter.

FIG. 12 is another cycle chart for selective adsorption in accordance with the process of the present invention, such as may suitably be carried out with apparatus similar to that shown and described in connection with FIG. 4 herein, but modified with a valved manifold connected to the intermediate portion of each adsorbent bed, where a step of sidestream depressurization to a lower process pressure is employed after the final pressure equalization-depressurization step and just prior to the countercurrent blowdown to the lowest process pressure. Thus, in this cycle, each of the adsorbent beds in the process system undergoes the sequential steps of adsorption, three successive pressure equalization-depressurization steps, side stream depressurization (SBD), countercurrent blowdown to lowest process pressure level, purging with externally supplied low pressure nitrogen gas, repressurization by three successive pressure equalization-repressurization steps and final repressurization with product gas. As shown, feed gas mixture is simultaneously introduced to each of three adsorbent beds in the process system at any given time, so that three adsorbent beds are carrying out the adsorption step at any given time in the process cycle.

Figure 13:
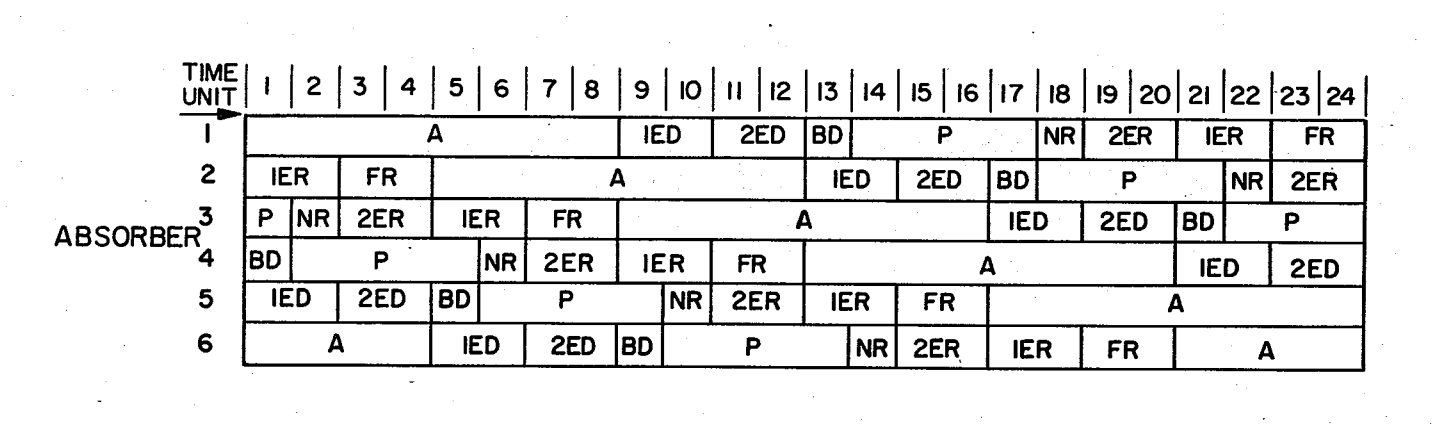
Figure 14:
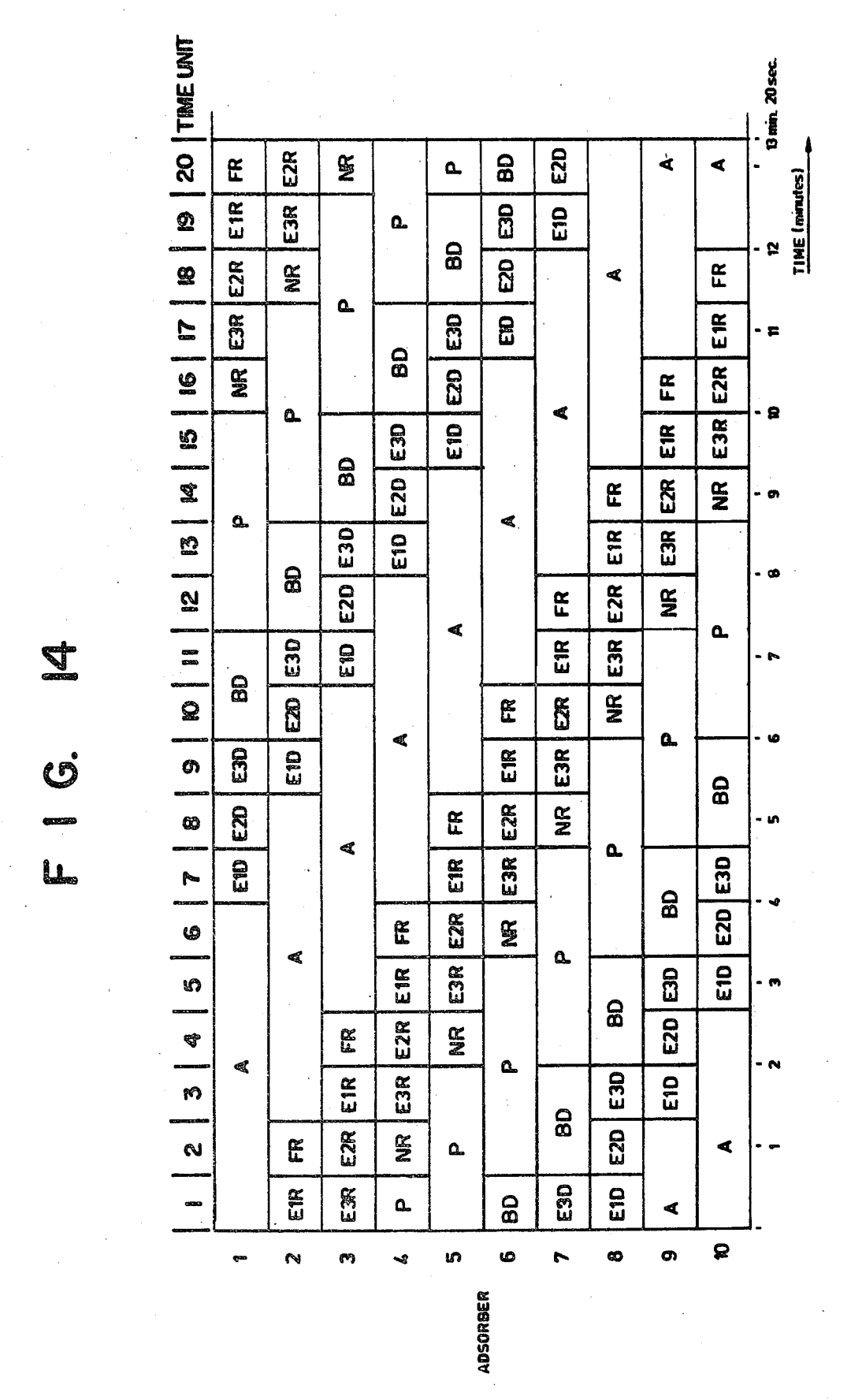

FIGS. 13 and 14 are cycle charts for embodiments of the invention such as may be conducted in adsorption systems comprising six and ten adsorbent beds, respectively, wherein a step of partially repressurizing the adsorbent bed with external source nitrogen gas is employed following the step of purging the adsorbent bed with external source nitrogen gas and immediately prior to the first pressure equalization-repressurization step. Thus, in each of these cycles, each adsorbent bed in the process system undergoes the sequential steps of adsorption, one or more pressure equalization-depressurization steps, countercurrent blowdown, purging with external source nitrogen gas, initial partial repressurization with higher-than-purge pressure external source nitrogen gas, one or more pressure equalization-repressurization steps and final repressurization with product gas.

The advantages of the present invention will be more clearly apparent from the following examples, which will include comparative data based on pressure swing adsorption treatment of feed gas mixtures having the composition set forth in Table I below.

TABLE I

Composition of Feed Gas Mixtures, With and Without $CO_2$ Removal Pretreatment, Prior to Separation by Pressure Swing Adsorption

| | Composition of the Feed Gas Mixture (mole %) | |
|---|---|---|
| | 1 | 2 |
| Component | Without $CO_2$ Removal Pretreatment | With $CO_2$ Removal Pretreatment |
| Hydrogen | 71.0 | 92.0 |
| Carbon Monoxide | 3.1 | 3.0 |
| Carbon Dioxide | 22.9 | 3.0 |
| Methane | 1.8 | 1.0 |
| Nitrogen | 1.2 | 1.0 |
| | 100.0 | 100.0 |

Table I shows two illustrative feed gas mixture compositions. The composition in column 1 is for a feed gas mixture which is typical of a stream from a steam reformer or a partial oxidation unit followed by a high temperature carbon monoxide shift conversion but without carbon dioxide removal. Column 2 shows a feed gas mixture composition which is typical of the same process system but with a carbon dioxide removal step disposed immediately upstream of the pressure swing adsorption step. In the following examples, the Table I feed gas mixtures of column 1 as well as column 2 are at pressure of 500 psia and temperature of 40° C. The examples are based on the production of ammonia synthesis gas mixture containing hydrogen and nitrogen in approximate 3:1 molar ratio, wherein the synthesis gas mixture is produced at a flow rate of 4920 kg mol/hour and a pressure of 493 psia. This synthesis gas mixture flow rate represents the influent gas mixture to an ammonia production unit corresponding to an ammonia production of approximately 1000 metric tons per day.

EXAMPLE I

This Example is based on a process for producing an ammonia synthesis gas mixture of hydrogen and nitrogen in accordance with the prior art, wherein the feed gas mixtures of Table I are processed by pressure swing adsorption to remove carbon monoxide, carbon dioxide and methane therefrom and yield a hydrogen-rich gas for forming the ammonia synthesis gas mixture. In this process system, selective adsorption is carried out using a ten adsorbent bed adsorption system such as is shown in FIG. 1 of Fuederer et al. U.S. Pat. No. 3,986,849, and as operated in accordance with the cycle chart of FIG. 2 in the Fuederer et al. patent, according to which each adsorbent bed undergoes three successive pressure equalization-depressurization steps following the adsorption step and immediately prior to a providing purge step wherein hydrogen-containing gas is released from the discharge end of the bed and is employed for purging of another adsorbent bed at lowest process pressure. Following the providing purge step, the adsorbent bed is countercurrently depressurized to lowest process pressure and purged in turn with hydrogen-containing gas from another bed in the adsorption system undergoing the providing purge step. After purging, the adsorbent bed is repressurized in three successive pressure equalization-repressurization steps, followed by final repressurization with product gas. In this process, all of the low pressure external source nitrogen gas is compressed to the synthesis gas pressure level of 493 psia prior to blending with the hydrogen-rich gas discharged as product from the pressure swing adsorption unit. The operating conditions and performance characteristics of this prior art process are set forth below in Table II, as tabulated in columns 1 and 2 for the respective feed gas mixture compositions of columns 1 and 2 in Table I.

TABLE II

Operating Conditions and Performance Characteristics of Process Employing 10 Adsorbent Bed Pressure Swing Adsorption System of U.S. Pat. No. 3,986,849

| | Feed Gas Mixture (see Table I) | |
|---|---|---|
| Parameter | 1 | 2 |
| Flow Rate of Feed Gas Mixture to Pressure Swing Adsorption Unit, kg mol/hour | 5910 | 4520 |
| Flow Rate of Hydrogen-Rich Gas Product from Pressure Swing Adsorption Unit, kg mol/hour | 3690 | 3690 |
| Composition of Hydrogen-Rich Gas Product from Pressure Swing Adsorption Unit: | | |
| Hydrogen (mole %) | 99.9 | 99.9 |
| Nitrogen (mole %) | 0.1 | 0.1 |
| Flow Rate of Nitrogen Gas Make-Up for the Product Synthesis Gas Mixture, kg mol/hour | 1230 | 1230 |
| Flow Rate of Product Synthesis Gas Mixture, kg mol/hour | 4920 | 4920 |
| Adsorbent Volume per Bed, arbitrary units | 100 | 65 |
| Number of Adsorbent Beds in the Pressure Swing Adsorption System | 10 | 10 |
| Recovery of Hydrogen from the Feed Gas Mixture Introduced to the Pressure Swing Adsorption System, as Contained in the Product Gas Discharged Therefrom, % | 87.9 | 88.7 |
| Compression Energy Expenditure for Nitrogen Gas Make-Up for the Product Synthesis Gas Mixture, Arbitrary Units | 100 | 100 |

The foregoing tabulated information will be used in the succeeding Examples as a basis for comparison of various illustrative embodiments of the process of the present invention with the practice of the prior art.

EXAMPLE II

This Example is based on a process for producing an ammonia synthesis gas mixture of hydrogen and nitrogen in accordance with the process of the present invention, as shown and described in connection with FIGS. 1-2 herein. Relative to Example I, this Example does not employ an internal providing purge step in the selective adsorption process. Instead, a first portion of low pressure nitrogen gas from the cryogenic air separation plant external source is employed as the purge gas, with a second portion of the low pressure nitrogen gas from the external source being externally compressed and thereafter mixed with the discharged hydrogen-rich gas product from the selective adsorption process to form the final product synthesis gas mixture.

Due to the elimination of the internal purge step in this case, it is possible to employ a further, fourth pressure equalization step while maintaining the same number of adsorbent beds as in the Example I base case; alternatively, the elimination of the internal providing purge step in accordance with the process of the present invention permits the total number of adsorbent vessels in the adsorption system to be reduced if the same number of pressure equalization steps is maintained as in the prior art base case of Example I. The second alternative of reducing the total number of adsorbent vessels while maintaining the same number of pressure equalization steps as in the prior art system will be shown more fully herein in a later Example.

The operating conditions and performance characteristics of the ammonia synthesis gas production process employing a ten adsorbent bed pressure swing adsorption system as shown and described in connection with FIGS. 1–2 herein are set forth below in Table III.

TABLE III

Operating Conditions and Performance Characteristics of Ammonia Synthesis Gas Production Process Employing 10 Adsorbent Bed Pressure Swing Adsorption System of FIGS 1-2

| Parameter | Feed Gas Mixture (see Table I) | |
|---|---|---|
| | 1 | 2 |
| Flow Rate of Feed Gas Mixture to Pressure Swing Adsorption Unit, kg-mol/hour | 5630 | 4380 |
| Flow Rate of Hydrogen-Rich Gas Product from Pressure Swing Adsorption Unit, kg mol/hour | 4165 | 4110 |
| Composition of Hydrogen-Rich Gas Product from Pressure Swing Adsorption Unit: | | |
| Hydrogen (mole %) | 88.6 | 89.8 |
| Nitrogen (mole %) | 11.4 | 10.2 |
| Flow Rate of Externally Compressed Nitrogen Gas Make-Up for the Product Synthesis Gas Mixture, kg-mol/hour | 755 | 810 |
| Flow Rate of Product Synthesis Gas Mixture, kg mol/hour | 4920 | 4920 |
| Adsorbent Volume per Bed, Arbitrary Units | 75 | 41 |
| Number of Adsorbent Beds in the Pressure Swing Adsorption System | 10 | 10 |
| Recovery of Hydrogen from the Feed Gas Mixture Introduced to the Pressure Swing Adsorption System, as contained in the Product Gas Discharged Therefrom, % | 92.2 | 91.6 |
| Compression Energy Expenditure for Nitrogen Gas Make-Up for the Product Synthesis Gas Mixture (external compression), Arbitrary Units | 60 | 65 |

In comparing the tabulated information for this Example with the tabulated information in Table II for Example I, it is seen that the process of the present invention results in significantly higher recovery of hydrogen. For the feed gas mixture of column 1 of Table I, the process of the present invention achieves a hydrogen recovery of 92.2% as against a recovery of only 87.9% for the prior art process of Example I. Again comparing the column 1 values of Tables II and III, the latter shows an adsorbent volume requirement per bed which is only 75% of that required for the prior art process of Example I. Finally, the process embodiment of this Example substantially reduces the external compression energy expenditure for the nitrogen gas makeup for the product synthesis gas mixture as compared with the energy expenditure which is required in the prior art process, by 40 percent for the column 1 feed gas mixture and by 35 percent for the column 2 feed gas mixture.

EXAMPLE III

In Example II the number of adsorbent beds in the adsorption system was maintained at the same number as in the prior art process of Example I, by the addition of a fourth pressure equalization step in the selective adsorption cycle of Example II in place of the providing purge step in the prior art process of Example I. As indicated earlier herein, it is also possible in the broad practice of the present invention to maintain the number of pressure equalization steps in the process of the present invention at the same number as in the prior art process, while reducing the overall number of adsorbent beds in the adsorption system. In this Example, the number of adsorbent beds has been reduced to 9 adsorbent beds from the 10 adsorbent beds employed in the Example I process, while maintaining the same number of pressure equalization steps, i.e., three successive pressure equalization phases. This Example is based on the use of the FIGS. 4–5 adsorption system in the ammonia synthesis gas production process. The parametric information on this embodiment of the present invention is set forth below in Table IV.

TABLE IV

Figure 4:
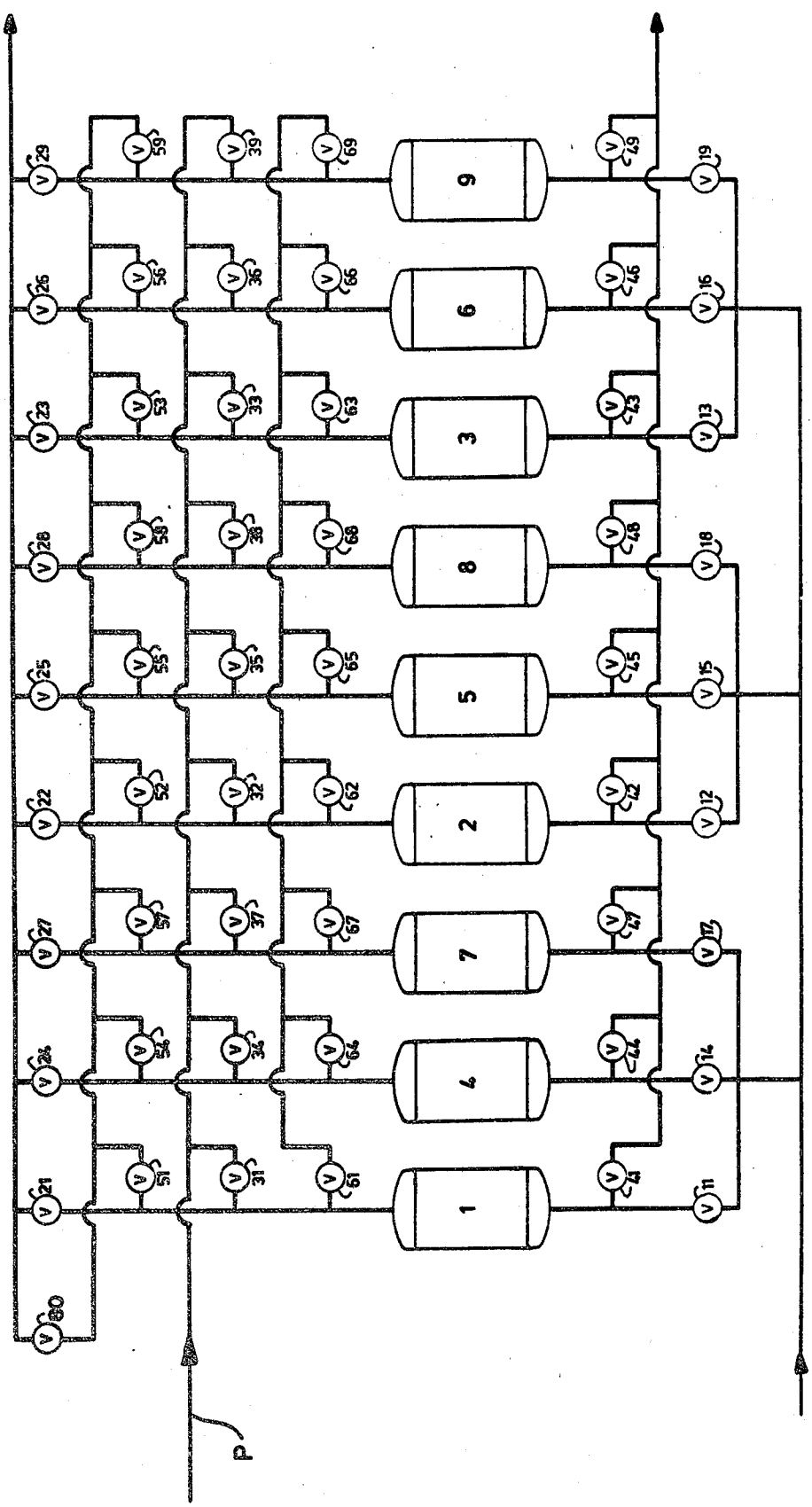
FIG. 4 is a schematic flow sheet of an adsorption system comprising nine adsorbent beds, such as is suitable for carrying out selective adsorption in the process of the present invention.

Operating Conditions and Performance Characteristics of Ammonia Synthesis Gas Production Process Employing 9 Adsorbent Bed Pressure Swing Adsorption System of FIGS 4-5

| Parameter | Feed Gas Mixture (see Table I) | |
|---|---|---|
| | 1 | 2 |
| Flow Rate of Feed Gas Mixture to Pressure Swing Adsorption Unit, kg-mol/hour | 5800 | 4500 |
| Flow Rate of Hydrogen-Rich Gas Product from Pressure Swing Adsorption Unit, kg-mol/hour | 4150 | 4100 |
| Composition of Hydrogen-Rich Gas Product from Pressure Swing Adsorption Unit: | | |
| Hydrogen (mole %) | 88.9 | 90.0 |
| Nitrogen (mole %) | 11.1 | 10.0 |
| Flow Rate of Externally Compressed Nitrogen Gas Make-Up for the Product Synthesis Gas Mixture, kg-mol/hour | 770 | 820 |
| Flow Rate of Product Synthesis Gas Mixture, kg-mol/hour | 4920 | 4920 |
| Adsorbent Volume per Bed, Arbitrary Units | 73 | 40 |
| Number of Adsorbent Beds in the Pressure Swing Adsorption System | 9 | 9 |
| Recovery of Hydrogen from the Feed Gas Mixture | | |

TABLE IV-continued

Operating Conditions and Performance Characteristics of Ammonia Synthesis Gas Production Process Employing 9 Adsorbent Bed Pressure Swing Adsorption System of FIGS 4-5

| Parameter | Feed Gas Mixture (see Table I) | |
|---|---|---|
| | 1 | 2 |
| Introduced to the Pressure Swing Adsorption System, as contained in the Product Gas Discharged Therefrom, % | 89.5 | 89.1 |
| Compression Energy Expenditure for Nitrogen Gas Make-Up for the Product Synthesis Gas Mixture (external compression), Arbitrary Units | 62 | 66 |

In comparing the results of this Example, as set forth above in Table IV, wherein the adsorption system includes 9 adsorbent beds operating on a cycle which includes three successive pressure equalization steps with the embodiment of Example II wherein the adsorption system comprises 10 beds operating on a cycle which includes four successive pressure equalization steps, it is seen that there is a 2.7% lower recovery of hydrogen in the 9 adsorbent bed system of this Example relative to the 10 adsorbent bed embodiment of Example II. Nonetheless, it is also to be noted that the inventory of adsorbent material is decreased by approximately 10% for the 9 bed embodiment of this Example relative to the 10 bed embodiment of Example II, while the external compression energy expenditure for nitrogen gas make-up for the product synthesis gas mixture is essentially the same in both embodiments. Accordingly, the choice of which of the Example II and Example III embodiments to use in a given application will depend upon consideration of trade-offs of capital equipment costs for the process system vs. the operating economics and hydrogen recovery requirements.

EXAMPLE IV

This Example is based on a 10 adsorbent bed adsorption system carrying out the process of FIG. 8 in the pressure swing adsorption unit of an ammonia synthesis gas production process. This embodiment of the present invention employs a cocurrent purge step immediately after the adsorption step and at the same pressure as the adsorption step to sweep hydrogen in the void space gas in the adsorbent bed into the product manifold of the pressure swing adsorption system. As indicated earlier herein, various cocurrent purge fluids may suitably be employed, such as nitrogen or natural gas, depending on various considerations such as the amount of purging required, and the quality of the feed gas mixture and waste gas from the pressure swing adsorption system as providing a suitably high heating value gas as waste gas for use as fuel in the process system. The process features and operating characteristics for a 10 absorbent bed adsorption system operating on the FIG. 8 cycle with natural gas at 500 psia as a cocurrent purging medium is tabulated in column 1 of Table V below, as based on the feed gas mixture composition of column 1 in Table I; column 2 in Table V sets forth corresponding information for a 10 adsorbent bed adsorption system operating on the FIG. 8 cycle using external source nitrogen gas compressed to cocurrent purge pressure of 500 psia as the purging medium, as based on the processing of a feed gas mixture having the compositions set forth in column 2 of Table I herein.

TABLE V

Operating Conditions and Performance Characteristics of Ammonia Synthesis Gas Gas Production Process Employing 10 Adsorbent Bed Pressure Swing Adsorption System Operating on Cycle of FIG. 8

| Parameter | Feed Gas Mixture (see Table I) | |
|---|---|---|
| | 1 | 2 |
| Flow Rate of Feed Gas Mixture to Pressure Swing Adsorption Unit, kg mol/hour | 5580 | 4280 |
| Flow Rate of Hydrogen-Rich Gas Product from Pressure Swing Adsorption Unit, kg-mol/hour | 4160 | 4210 |
| Composition of Hydrogen-Rich Gas Product from Pressure Swing Adsorption Unit: | | |
| Hydrogen (mole %) | 88.7 | 88.1 |
| Nitrogen (mole %) | 11.3 | 10.9 |
| Cocurrent Purge Fluid | Natural gas at 500 psia | External Source Nitrogen Gas Compressed to 500 psia |
| Cocurrent Purge Gas Flow Rate, kg mol/hour | 350 | 350 |
| Flow Rate of Nitrogen Gas Make-Up for the Product Synthesis Gas Mixture, kg mol/hour | 760 | 710 |
| Flow Rate of Product Synthesis Gas Mixture, kg-mol/hour | 4920 | 4920 |
| Adsorbent Volume per Bed, Arbitrary Units | 73 | 40 |
| Number of Adsorbent Beds in the Pressure Swing Adsorption System | 10 | 10 |
| Recovery of Hydrogen from the Feed Gas Mixture Introduced to the Pressure Swing Adsorption System, as contained in the Product Gas Discharged Therefrom, % | 93.1 | 93.8 |
| Compression Energy Expenditure for Nitrogen Gas Make-Up for the Product Synthesis Gas Mixture (external compression), Arbitrary Units | 61 | 90 |

If the values in column 1 of Table V, based on high pressure cocurrent purging with natural gas and subsequent countercurrent purging with external source nitrogen gas, are compared with the corresponding values in column 1 of Table III in Example II, wherein the only purge step is conducted at low pressure using external source nitrogen gas, it is seen that the recovery in the former case is 0.9% higher than in the latter case with all other parameters essentially the same. Nonetheless, in the former case of this Example, the quality (heating value) of the waste gas from the adsorption system is substantially improved due to the presence of natural gas purging medium therein. If the values in column 2 of Table V are compared with the corresponding values in column 2 of Example II, it is seen that the hydrogen recovery in the former case of this Example has been increased to 93.8% relative to the recovery value of 91.6% which is characteristic of the Table III, column 2 embodiment where cocurrent purging at high pressure is not employed; nonetheless, the nitrogen gas external compression energy expenditure has increased by 39 percent over that of the Table III, column 2 embodiment, as a result of the requirement in the embodiment of this Example of externally compressing external source nitrogen gas to the elevated pressure of 500 psia as required for cocurrent purging of the adsorbent beds. By contrast to these embodiments of the present invention, the prior art process of Table II, column 2 is characterized by a hydrogen recovery of only 88.7% with a compression energy expenditure for nitrogen gas make-up greater, by 11-64 percent, than for the embodiment of this Example. Accordingly, it is apparent that the high pressure cocurrent purge step of this Example affords a substantial improvement in recovery relative to the prior art process, with a moderate to substantial savings in compression energy expenditure depending upon the composition of the feed gas mixture which is introduced to the pressure swing adsorption system.

EXAMPLE V

This Example is for an embodiment of the present invention wherein a nine adsorbent bed adsorption system similar to that shown and described in connection with FIGS. 4–5 is operated on the cycle shown in the cycle chart of FIG. 9, in an ammonia synthesis gas mixture production process. In this embodiment, a cocurrent depressurization step is interposed between the third pressure equalization-depressurization step and the countercurrent depressurization step of the adsorption system cycle, with the cocurrent depressuring effluent being compressed to form a further part of the hydrogen-rich gas product discharged from the selective adsorption system. The data for this embodiment of the invention are set forth below in Table VI.

TABLE VI

Operating Conditions and Performance Characteristics of Ammonia Synthesis Gas Production Process Employing 9 Adsorbent Bed Pressure Swing Adsorption System Operating in Accordance with FIG. 9 Cycle Chart

| Parameter | Feed Gas Mixture (see Table I) 1 |
|---|---|
| Flow Rate of Feed Gas Mixture to Pressure Swing Adsorption unit, kg-mol/hour | 5530 |
| Flow Rate of Hydrogen-Rich Gas Product from Pressure Swing Adsorption Unit, kg-mol/hour | 4170 |
| Composition of Hydrogen-Rich Gas Product from Pressure Swing Adsorption Unit: | |
| Hydrogen (mole %) | 88.3 |
| Nitrogen (mole %) | 11.7 |
| Flow Rate of Nitrogen Gas Make-Up for the Product Synthesis Gas Mixture, kg mol/hour | 750 |
| Flow Rate of Product Synthesis Gas Mixture, kg mol/hr | 4920 |
| Adsorbent Volume per Bed, Arbitrary Units | 76 |
| Number of Adsorbent Beds in the Pressure Swing Adsorption System | 9 |
| Recovery of hydrogen from the Gas Mixture Introduced to the | |

TABLE VI-continued

Operating Conditions and Performance Characteristics of Ammonia Synthesis Gas Production Process Employing 9 Adsorbent Bed Pressure Swing Adsorption System Operating in Accordance with FIG. 9 Cycle Chart

| Parameter | Feed Gas Mixture (see Table I) 1 |
|---|---|
| Pressure Swing Adsorption System, as Contained in the Product Gas Discharged therefrom, % | 94.0 |
| Compression Energy Expenditure for Nitrogen Gas Make-Up for the Product Synthesis Gas Mixture, Arbitrary Units | 60 |
| Compression Energy Expenditure for Compression of Cocurrent Depressurization Gas to Final Product Pressure, Arbitrary Units | 6 |

If the embodiment of this Example is compared with the embodiment of Table 4, column 1 in Example 3, wherein no cocurrent depressurization step is employed, it is seen that the percent hydrogen recovery is improved by the provision of a cocurrent depressurization step in this Example from the level of 89.5% characteristic of the Table IV, column 1 embodiment of Example 3 to 94.0% at the expense of an 8 percent increase in compression power expenditure and a 3.5% increase in adsorbent bed size.

EXAMPLE VI

This Example is based on the use of a nine adsorbent bed, three pressure equalization step system as shown and described in connection with FIGS. 4–5, as implemented in the FIG. 10 process system according to the present invention, wherein a first portion of external source nitrogen gas in line 738 is employed for purging of adsorbent beds in the pressure swing adsorption zone 723 with a second portion of the low pressure nitrogen gas being compressed in compressor 733 and conveyed by line 734 for mixing with the hydrogen-rich product gas from the pressure swing adsorption unit discharged in line 724 and wherein the countercurrent depressurization effluent gas from the pressure swing adsorption unit in line 739 is recirculated to the carbon monoxide shift converter in line 728. The data for this case is set forth below in Table 7, for a feed gas mixture of the composition set forth in column 2 of Table 1 herein.

TABLE 7

Operating Conditions and Performance Characteristics of FIG. 17 Process Employing Nine Adsorbent Bed Pressure Swing Adsorption System of FIGS. 4–5

| Parameter | Feed Gas Mixture (see Table I) 2 |
|---|---|
| Flow rate of feed gas mixture to Pressure Swing Adsorption Unit, kg-mol/hour | 4540 |
| Flow rate of hydrogen-rich gas product from Pressure Swing Adsorption Unit, kg mol/hour | 4120 |
| Composition of hydrogen-rich gas product from Pressure Swing Adsorption Unit: | |
| Hydrogen (mole %) and | 89.5 |

TABLE 7-continued
Operating Conditions and Performance
Characteristics of FIG. 17 Process
Employing Nine Adsorbent Bed Pressure
Swing Adsorption System of FIGS. 4-5

| Parameter | Feed Gas Mixture (see Table I) 2 |
|---|---|
| Nitrogen (mole %) | 10.5 |
| Flow Rate of Nitrogen Gas Make-Up for the Product Synthesis Gas Mixture, kg-mol/hr | 800 |
| Flow Rate of Product Gas Mixture, kg mol/hour | 4920 |
| Adsorbent Volume per bed, Arbitrary Units | 41 |
| No. of Adsorbent beds in the Pressure Swing Adsorption System | 9 |
| Recovery of Hydrogen from the Feed Gas Mixture Introduced to the Pressure Swing Adsorption System, as Contained in the Product Gas Discharged therefrom, % | 98.5 |
| Compression Energy Expenditure (External) for Nitrogen Gas Make-Up for the Product Synthesis Gas Mixture, Arbitrary Units | 64 |
| Compression Energy Expenditure for Compression of Recycle Gas, Arbitrary Units | 30 |
| Recycle Gas Flow Rate, kg-mol/hour | 502 |

The embodiment of this Example, relative to the prior art process of Example I, achieves a substantial improvement in hydrogen recovery (98.5% v. 80.7%), a modest reduction in compression energy expenditure in the process (6 percent) and a substantial reduction in adsorbent volume for the overall process, of 43 percent.

Several variations of the embodiment of this Example may usefully be employed in practice. For example, the compression energy requirements of the overall process may be reduced at the expense of lower hydrogen recovery in the process by recycling only a portion of the countercurrent depressurization effluent to the upstream process steps. Alternatively, hydrogen recovery in the process may be increased at the expense of an increased compression power consumption via recirculation of a portion of the purging effluent to either the hydrogen formation step (partial oxidation unit 712 in the FIG. 10 process) for further conversion of methane contained in the purging effluent or by recirculating a portion of the purging effluent to the carbon monoxide shift converter, or by recycling portions of the purging effluent respectively to the hydrogen formation step and to the carbon monoxide shift converter. A portion of the purging effluent must always be discharged from the process system as waste gas (line 741) in order to remove the non-reactive components from the process system which would otherwise build up in the recirculation loops therein.

EXAMPLE VII

This Example is based on the use of the nine adsorbent bed adsorption system of FIG. 4 to carry out the adsorption cycle shown in FIG. 12 in the pressure swing adsorption complex 723 of the FIG. 10 process system. In the FIG. 12 cycle, a step of side stream depressurization is interposed between the three successive pressure equalization-depressurization steps and the external source nitrogen gas purge step. In the side stream depressurization step, the adsorbent bed is depressurized to lowest process pressure by discharge of gas from the adsorbent bed at a point intermediate the inlet and discharge ends thereof. This Example is based on recirculation of the discharged side stream depressurization gas to the carbon monoxide shift converter to enhance the production rate of hydrogen in the process system. Data for this Example are set forth below in Table VIII.

TABLE VIII
Operating Conditions and Performance
Characteristics of FIG. 10 Process
Employing Nine Adsorbent Bed Pressure
Swing Adsorption System of FIG. 4
Operating on Cycle of FIG. 12

| Parameter | Feed Gas Mixture (see Table I) 1 |
|---|---|
| Flow Rate of Feed Gas Mixture to Pressure Swing Adsorption Unit, kg-mol/hour | 5800 |
| Flow Rate of Hydrogen-Rich Gas Product from Pressure Swing Adsorption Unit, kg-mol/hour | 4180 |
| Composition of Hydrogen-Rich Gas Product from Pressure Swing Adsorption Unit: | |
| Hydrogen (mole %) | 88.2 |
| Nitrogen (mole %) | 11.8 |
| Flow Rate of Nitrogen Gas Make-Up for the Product Synthesis Gas Mixture kg mol/hour | 740 |
| Flow Rate of Product Synthesis Gas Mixture, kg mol/hour | 4920 |
| Adsorbent Volume per bed, Arbitrary Units | 73 |
| No. of Adsorbent Beds in the Pressure Swing Adsorption System | 9 |
| Recovery of Hydrogen from the Feed Gas Mixture Introduced to the Pressure Swing Adsorption System, as Contained in the Product Gas Discharged Therefrom, % | 97.0 |
| Compression Energy Expenditure (External) for Nitrogen Gas Make-Up for the Product Synthesis Gas Mixture, Arbitrary Units | 59 |
| Compression Energy Expenditure for Recycle Gas Compression, Arbitrary Units | 21 |

In comparing this Example with Example 6 wherein the countercurrent depressurization effluent was recycled to the carbon monoxide shift converter, it is to be noted that the primary purpose of side stream depressurization of the adsorbent bed to lowest process pressure is to avoid recirculation of large amounts of carbon dioxide to the upstream portions of the process system. For this reason, where the pressure swing adsorption system is employed to separate a feed gas mixture having a composition similar to that of column 1 in Table I, containing a substantial proportion of carbon dioxide, the side stream depressurization cycle of FIG. 12 is highly desirable. For such a feed gas mixture containing a high proportion of carbon dioxide, the use of an adsorption cycle employing countercurrent depressurization to lowest process pressure with recirculation of the countercurrent depressurization effluent to the carbon monoxide shift convertor in the process system would undesirably increase the compression energy requirements for compression of the recycle gas. On the other hand, where only small amounts of carbon dioxide are present in the feed gas mixture introduced to the pressure swing adsorption system, countercurrent depressurization of the adsorbent bed in the manner of Example 6 is preferred.

In comparing this Example with the prior art process of Example 1, as based on the values in the respective Examples set forth for the feed gas mixture composition set forth in Column 1 of Table 1, it is seen that hydrogen recovery in this Example is increased to 97.0% from the 87.9% level of the prior art process system, compression requirements for the process are reduced by 20 percent and the adsorbent inventory for the overall process is reduced by 34 percent.

EXAMPLE VIII

This Example is based on a comparision of the extent of increase in the production rate limit of a single processing unit of the process systems of Examples 2-7 relative to the prior art process system of Example 1.

In general, the production rate of product from a single adiabatic pressure swing adsorption process unit is limited by the capacity of the adsorbent beds for processing and separating the feed gas mixture. The capacity of an adsorbent bed is in turn limited by the maximum size which may be controlled by either the physical strength of the individual adsorbent particles or by the permissible shipping size of vessels. If greater capacity is required in a given application, then multiple processing units are required.

It will be apparent from an inspection of the tabulated data of Examples 2-7 with Example 1 that the various process embodiments of the present invention are all able to provide a substantial reduction in the requirement of adsorbent per bed relative to the adsorbent requirement of the vessels in the prior art process system of Example 1. This reduction in adsorbent requirements for the adsorbent vessels in the various embodiments of the present invention relative to the prior art process of Example 1 may be advantageously employed to increase the production rate of hydrogen-rich product gas from the pressure swing adsorption system during a given cycle relative to the prior art process system, by utilizing the same size adsorbent bed as is employed in the adsorbent vessels of the prior art process. Based on a maximum bed size of 100 arbitrary units and 65 arbitrary units of adsorbent, respectively, as tabulated for the adsorbent beds in the prior art process of Example 1 for a feed gas mixtures having the compositions as set forth in Table I herein, Table 9 below shows the percent increase in production rates of hydrogen-rich gas product from the pressure swing adsorption unit, using the prior art process of Example 1 as a base case.

TABLE IX

Percentage Increase In Production Rate Of Hydrogen-Rich Gas Product From The Pressure Swing Adsorption Unit For Examples 2-7 Relative To the Base Case of Example I (With Feed Gas Mixture Having a Composition Corresponding To That Set Forth in Table I)

| | | Percent Increase in Production Rate of Hydrogen-Rich Gas Product From the Pressure Swing Adsorption System Feed Gas Mixture (See Table I) | |
|---|---|---|---|
| Example | Description | Column 1 | Column 2 |
| I | Process of Fuderer U.S. Pat. 3,986,849, with Internal Purging | 0 | 0 |
| II | External Nitrogen Purge- 10 Beds, Four Equalizations | 34 | 59 |
| III | External Nitrogen Purge- 9 Beds, Three Equalizations | 36 | 63 |
| IV | External Nitrogen Purge and High-Pressure Cocurrent Displacement Purge | 36 | 63 |
| V | External Nitrogen Purge and Compression of Cocurrent Depressurization Effluent to Product | 32 | — |
| VI | External Nitrogen Purge with Recycle of Countercurrent Depressurization Gas to CO Shift Converter | — | 59 |
| VII | External Nitrogen Purge with Recycle of Side Stream Depressurization Effluent to CO Shift Converter | 36 | — |

As shown by the values in the above Table, the process of the present invention may be employed to substantially increase the production rate of hydrogen-rich gas product from the pressure swing adsorption system relative to the production rate of product attainable with the prior art process of Example 1. Thus, for example, for a feed gas mixture containing a relatively high concentration of carbon dioxide corresponding to the composition set forth in Column 1 of Table I, it is possible to increase the production rate of hydrogen-rich product gas from the pressure swing adsorption system in the practice of the present invention by as much as 36% relative to the process of the prior art. For the separation of feed gas mixture in accordance with the process of the present invention using a feed gas mixture containing a low level of carbon dioxide, corresponding to the composition set forth in Column 2 of Table I, the production rate increase obtainable in the practice of the present invention can be as much as 150% relative to the prior art process of Example 1.

EXAMPLE IX

This Example is based on a comparison of ammonia synthesis gas production processes carried out in accordance with the present invention and in accordance with the prior art, using a four adsorbent bed adsorption system of the type disclosed and claimed in Wagner U.S. Pat. No. 3,430,418 as the adsorption system in the respective ammonia synthesis gas production processes. Although in the general practice of the present invention, it is preferred to employ an adsorption system comprising at least seven adsorbent beds, as indicated earlier herein, in the case where production rate requirements for hydrogen-rich gas product from the pressure swing adsorption unit are small or where other factors are more important than maximizing hydrogen recovery in the process, a four adsorbent bed system of the type disclosed and claimed in the Wagner patent may usefully be employed.

In this Example three comparative cases were developed, denoted hereinafter as cases "A", "B", and "C", all based on the use of a four adsorbent bed adsorption system employing one pressure equalization-depressuration step following the adsorption step. Each of the respective cases is described in detail below and all comparisions are based on the selective adsorption treatment of a feed gas mixture of the composition set forth in Column 2 of Table I herein.

Case "A" is based on the FIG. 1 process system employing the process of Wagner U.S. Pat. No. 3,430,418 in the adsorption system in the process. In the adsorption system, each adsorbent bed undergoes a repetitive cycle consisting of the steps of adsorption, pressure equalization with another bed, a providing purge depressurization step wherein gas released from the discharge end of the adsorbent bed is employed to purge another adsorbent bed in the system at lowest process pressure, countercurrent depressurization of the adsorbent bed to lowest process pressure, purging with gas discharged from another adsorbent bed in the system as the latter's providing purge step, repressurization by pressure equalization with another depressurizing bed in the system and final repressurization with product gas.

Case "B" is based on a process carried out in accordance with the present invention, wherein the adsorption zone comprises a four adsorbent bed unit of the type shown in FIG. 6 herein and operating on the process cycle shown in FIG. 7, according to which each bed in the adsorption system undergoes the successive steps of adsorption, depressurization by pressure equalization with another bed being repressurized, countercurrent depressurization of the bed to lowest process pressure, purging of the bed with external source nitrogen gas, repressurization of the bed by pressure equalization with another (depressurizing) bed and final repressurization with product gas.

Case "C" is based on the same system described above in connection with Case "B", but with recycle of the countercurrent depressurization effluent from the adsorbent beds to the carbon monoxide shift converter in the process system.

Data for the comparison of Cases "A", "B" and "C" are set forth below in Table X.

TABLE X

Operating Conditions and Performance Characteristics of Ammonia Synthesis Gas Mixture Production Processes Employing Four Adsorbent Bed Pressure Swing Adsorption Systems

| Parameter | Case "A" | Case "B" | Case "C" |
|---|---|---|---|
| Purging with External Source Nitrogen Gas | NO | YES | YES |
| Recycle of Countercurrent Blowdown Effluent to CO Shift Converter | NO | NO | YES |
| Adsorbent Volume per Bed, Arbitrary Units | 140 | 116 | 116 |
| Hydrogen, Recovery % | 72 | 80.6 | 98.5 |
| Total Compression Energy Expenditure[1], Arbitrary Units | 100 | 60 | 110 |

[1]includes power expenditure for compression of make-up nitrogen gas as well as compression power expended for compression of the recycled gas.

As shown in Table X, the process embodiments of the present invention corresponding to Cases "B" and "C" achieve substantial improvement in hydrogen recovery relative to the prior art process employing a four adsorbent bed adsorption system with internal purging of the adsorbent beds therein. Case "B" shows a hydrogen recovery of 80.6% and Case "C" attains a hydrogen recovery level of 98.5%, in contrast to the 72% hydrogen recovery which is achieved by the prior art process of Case "A". It will also be noted that the Case "B" embodiment of the present invention achieves a 40% reduction in compression power expenditure relative to the prior art process of Case "A", while the Case "C" embodiment of the present invention achieves a 98.5% recovery of hydrogen, but at the expense of a 10% increase in total process power expenditure for gas compression in Case "C", over the compression power expenditure of the Case "A" process.

EXAMPLE X

This Example is based on a modification of the process system of Example VI wherein streams of both low and medium pressure nitrogen are available from a source such as a cyrogenic air separation plant or other external source of nitrogen gas and the medium pressure nitrogen gas is employed in the repressurization of the adsorbent beds in the adsorption system; see, for example, FIGS. 13 and 14.

More specifically, in the process embodiment of this Example, low pressure nitrogen gas is available from the cryogenic air separation plant at a pressure of 23 psia, and the same (first portion external source nitrogen gas) is employed to purge the adsorbent beds after their countercurrent depressurization, in the previously described manner. An additional moderate pressure nitrogen gas stream (second portion external source nitrogen gas) is available from the cryogenic air separation plant at a pressure of about 85 psia, and this moderate pressure nitrogen gas is employed for partial repressurization of an adsorbent bed after its purging step and prior to the one or more stages of pressure equalization-repressurization. Final repressurization of the bed to the first highest superatmospheric pressure is carried out with product gas in the previously described manner.

As has been previously stated, the objective of the process of the invention is to produce an ammonia synthesis gas mixture, as for example may contain a stoichiometric 3:1 molar ratio of hydrogen to nitrogen. In the previous Examples I-IX, several embodiments of the invention have been described wherein external source nitrogen that remains in the adsorbent bed at the end of the nitrogen gas purging step is compressed during the subsequent repressurization steps and appears during the adsorption step in the discharge unadsorbed product gas, blended with hydrogen at product gas pressure. In the prior Examples, the discharged unadsorbed product gas contained hydrogen and nitrogen in a molar ratio greater than 3, so that additional external source nitrogen was subsequently externally compressed and added to the gas mixture discharged from the adsorption system to form the product ammonia synthesis gas mixture containing hydrogen and nitrogen in the desired 3:1 molar ratio. The present Example employs external source nitrogen gas for both purging and partial repressurization, so that the quantity of nitrogen make-up for the product ammonia synthesis gas mixture which requires external compression in the process system is extremely small. The low quantity of nitrogen gas make-up requiring external compression is in turn a result of the fact that at the moderate pressure nitrogen gas partial repressurization pressure of 85 psia, the adsorbent bed will adsorb 2.5 times more nitrogen than is adsorbed as a result of the purging step at 23 psia with first portion low pressure nitrogen gas.

Data for the moderate pressure nitrogen gas partial repressurization embodiment of this Example is set forth below in Table 11.

TABLE 11

OPERATING CONDITIONS AND PERFORMANCE CHARACTERISTICS OF A MODIFIED EXAMPLE IV PROCESS EMBODIMENT EMPLOYING MODERATE PRESSURE EXTERNAL SOURCE NITROGEN GAS PARTIAL REPRESSURIZATION

| Parameter | Value |
|---|---|
| Adsorption Step Pressure, psia | 500 |
| Bed Pressure Prior to Third Pressure Equalization-Repressurization Step, psia | 85 |
| Mole % Nitrogen in Hydrogen-rich Gas Product from Pressure Swing Adsorption Unit | 23.4 |
| Total System Compression Energy Expenditure, Arbitrary Units | 70 |

In Table 11, the total system gas compression energy requirement of 70 units includes an expenditure of 8 units for nitrogen compression to 500 psia (externally compressed second portion nitrogen gas blended into the hydrogen-rich gas product from the pressure swing adsorption unit to form the final product ammonia synthesis gas mixture), an expenditure of 26 units for compression of nitrogen to the pressure level of 85 psia for partial repressurization of the adsorbent beds and an expenditure of 36 units for compression of recycle gas comprising the countercurrent blow down gas from the adsorbent beds.

Comparison of the values in Table 11 with the corresponding values set forth in Table 7 of Example VI shows that the moderate pressure nitrogen gas partial repressurization embodiment of this Example results in the presence of substantially higher concentrations of nitrogen in the hydrogen-rich product gas from the pressure swing adsorption unit than are obtained in the embodiment of Example VI (23.4 mole % versus 10.5 mole %). It is also seen that the total system compression energy in the embodiment of this Example is substantially lower than the total gas compression energy requirements for the Example VI embodiment.

In light of the foregoing, it is seen that if the pressure of the partial repressurization second portion of the external source nitrogen gas had been somewhat higher, then the amount of nitrogen in the adsorption system product gas could have been raised to 25 mole %, as necessary to provide a 3:1 molar ratio of hydrogen to nitrogen. The exact pressure level for such purpose depends on several design factors, such as feed composition, adsorbent type and quality, feed and purge pressure levels and the specific adsorption cycle employed. Accordingly, any of the previously described Examples I-IX could also employ an external source nitrogen gas repressurization step in order to minimize nitrogen gas external compression requirements in the process system.

Although preferred embodiments have been described in detail, it will be further appreciated that other embodiments are contemplated only with modification of the disclosed features, as being within the scope of the invention.

What is claimed is:

1. In a process for forming a gas mixture containing hydrogen and nitrogen for ammonia synthesis wherein a feed gas mixture containing hydrogen and adsorbable impurities is separated by selective adsorption of said impurities in each of multiple adsorbent beds by the cycle of introducing feed gas mixture to the bed inlet end at first highest superatmospheric pressure, discharging unadsorbed hydrogen-rich gas from the bed discharge end, releasing initial void space gas from the bed discharge end and introducing the so-released initial gas to the discharge end of another adsorbent bed previously purged of said impurities and initially at lower pressure until the two beds are pressure equalized at higher intermediate pressure, releasing additional gas from the bed for depressurization thereof to lowest pressure, introducing purge gas to the bed discharge end for desorption of impurities and purging through the bed inlet end, and repressurizing the purged bed to said fist highest superatmospheric pressure and thereafter repeating the cycle, the improvement comprising at least one of the following steps:

(a) purging the bed during said purging step with external source nitrogen gas such that at the termination of said purging step nitrogen gas is retained in the bed, compressed in the subsequent purged bed repressuring step to said first highest superatmospheric pressure and thereafter discharged in said unadsorbed hydrogen-rich gas, with the discharged gas forming said gas mixture containing hydrogen and nitrogen; and (b) repressurizing the bed during the repressurizing step with external source nitrogen gas such that the introduced nitrogen gas is compressed to said first highest superatmospheric pressure and thereafter discharged in said unadsorbed hydrogen-rich gas, with the discharged gas forming said gas mixture containing hydrogen and nitrogen.

2. A process according to claim 1 wherein said gas mixture containing hydrogen and nitrogen has a molar ratio of hydrogen to nirogen greater than 3, further comprising the step of externally compressing external source nitrogen gas to the pressure of said discharged unadsorbed hydrogen-rich gas and mixing the externally compressed nitrogen gas therewith in sufficient quantity to form a product synthesis gas mixture with a hydrogen to nitrogen molar ratio of approximately 3.

3. A process according to claim 2 wherein the ratio of said first highest superatmospheric pressure to the pressure of said purge gas in said purging step is at least 5.

4. A process according to claim 1 wherein said purged bed is repressurized during the repressurizing step with feed gas mixture or discharged unadsorbed hydrogen-rich gas.

5. A process according to claim 1 wherein the ratio of the discharged hydrogen-rich gas pressure to the external source nitrogen gas pressure is from 3 to 30.

6. A process according to claim 1 wherein said gas mixture containing hydrogen and nitrogen has a hydrogen to nitrogen molar ratio of approximately 3.

7. A process according to claim 6 wherein the ratio of said first highest superatmospheric pressure to the pressure of said purge gas is from 4 to 7.

8. A process according to claim 1 wherein the purged bed is partially repressurized during the repressurizing step with external source nitrogen gas to an intermediate pressure which is from 0.10 to 0.30 times said first highest superatmospheric pressure.

9. A process according to claim 8 wherein the ratio of said first highest superatmospheric pressure to the pressure of said purge gas in said purging step is at least 5.

10. A process according to claim 1 comprising dividing external source nitrogen gas into two portions and employing a first portion as purge gas for said purging step, with a second portion being externally compressed and thereafter mixed with said discharged hydrogen-rich gas to form a product synthesis gas mixture with a hydrogen to nitrogen molar ratio of approximately 3.

11. A process according to claim 10 wherein the molar ratio of the total first portion nitrogen gas introduced to the adsorbent bed during the purge step to the total second portion low pressure nitrogen gas mixed with the hydrogen-rich gas discharged from the bed during the adsorption step is above 0.6.

12. A process according to claim 10 wherein the total power requirement for said external compression of said second portion nitrogen gas per unit volume of said product synthesis gas mixture produced by the process is from 0.05 to 0.7 Kw-hr/kg-mole synthesis gas mixture.

13. A process according to claim 1 wherein at least six adsorbent beds are provided, comprising the further steps of: simultaneously introducing feed gas mixture to the inlet ends of at least two adsorbent beds in overlapping identical cycles sequentially from the first to the highest numbered bed and thereafter continuously repeating the sequence such that during the initial period of a bed adsorption step the immediately preceding lower numbered bed is also on its adsorption step and during the last period the immediately following higher numbered bed is also on its adsorption step; performing the initial void space gas releasing-pressure equalization in at least two separate phases comprising first pressure equalizing the adsorbent bed having completed its adsorption step with a different previously purged and at least third higher numbered bed initially at lower intermediate pressure so that the two beds are finally at a first equalization pressure; and second pressure equalizing the adsorbent bed initially at said first equalization pressure with a still different previously purged and at least fourth higher numbered bed initially at still lower intermediate pressure so that the two beds are finally at a second equalization pressure.

14. A process according to claim 13 wherein at least nine adsorbent beds are provided in overlapping identical cycles such that during the initial period of a bed adsorption step the two immediately preceding lower numbered beds are also on their adsorption steps, during the middle period of a bed adsorption step the immediately preceding lower numbered and immediately following higher numbered beds are also on their adsorption steps, and during the last period of a bed adsorption step the two immediately following higher numbered beds are also on their adsorption steps.

15. A process according to claim 13 wherein the adsorbent bed after the final pressure equalizing step is cocurrently depressurized to lower pressure with discharge of the cocurrent depressurization gas from the bed discharge end and subsequent compression thereof to form a further part of said hydrogen-rich gas, and the bed is thereafter countercurrently depressurized to said lowest pressure.

16. A process according to claim 1 wherein at least nine adsorbent beds are provided, comprising the further steps of: simultaneously introducing feed gas mixture to the inlet ends of three adsorbent beds in overlapping identical cycles sequentially from the first to the highest numbered bed and thereafter continuously repeating the sequence such that during the initial period of a bed adsorption step the two immediately preceding lower numbered beds are also on their adsorption steps, during the middle period of a bed adsorption step the immediately preceding lower numbered and immediately following higher numbered beds are also on their adsorption steps, and during the last period of a bed adsorption step the two immediately following higher numbered beds are also on their adsorption steps; performing the initial void space gas releasing-pressure equalization in three separate phases comprising first pressure equalizing an adsorbent bed having completed its adsorption step with the fourth higher numbered adsorbent bed initially at a second equalization pressure so that the two beds are finally at a first equalization pressure, second pressure equalizing said adsorbent bed with the fifth higher numbered adsorbent bed initially at a third equalization pressure so that the two beds are finally at a second equalization pressure, and third pressure equalizing said adsorbent bed with the sixth higher numbered adsorbent bed initially at said lowest pressure so that the two beds are finally at said third equalization pressure; and thereafter conducting the depressurization and purging steps in said adsorbent bed.

17. A process according to claim 1 wherein at least four adsorbent beds are provided and said repressurization of the purged bed to said first highest superatmospheric pressure is carried out by pressure equalizing the purged bed with a still other bed having just completed its adsorption step so that the two beds are finally at higher intermediate pressure, followed by final repressurization with said feed gas mixture to said first highest superatmospheric pressure.

18. A process according to claim 1 wherein said feed gas mixture is derived by the steps of: reacting a hydrocarbon feedstock and oxygen gas for partial oxidation of the former to yield a partial oxidation product gas mixture containing hydrogen, carbon monoxide and carbon dioxide, catalytically reacting at least a major portion of a carbon monoxide in said partial oxidation product gas mixture with water to yield hydrogen and carbon dioxide and form a further reaction product gas mixture containing hydrogen, carbon dioxide and residual carbon monoxide, and removing at least a major portion of the carbon dioxide in said further reaction product gas mixture by selective adsorption to yield said feed gas mixture containing hydrogen and adsorbable impurities including residual carbon monoxide and carbon dioxide.

19. A process according to claim 18 further comprising cryogenically separating air to yield oxygen gas for said partial oxidation catalytic reaction step and nitrogen gas, the latter comprising said external source nitrogen gas.

20. A process according to claim 1 wherein said feed gas mixture is formed by steam reforming of a hydrocarbon feedstock.

21. A process according to claim 1 wherein external source nitrogen gas at first highest superatmospheric pressure is introduced to the bed inlet end after termination of the adsorption step for displacement of unadsorbed hydrogen-rich void space gas and discharge thereof from the bed discharge end as a further part of said discharged hydrogen-rich gas.

22. A process according to claim 1 wherein at least ten adsorbent beds are provided, comprising the further steps of: simultaneously introducing feed gas mixture to the inlet ends of at least three adsorbent beds in overlapping identical cycles sequentially from the first to the highest numbered bed and thereafter continuously repeating the sequence such that during the initial period of a bed adsorption step the immediately preceding lower numbered bed is also on its adsorption step and during the last period the immediately following higher numbered bed is also on its adsorption step; performing the initial void space gas releasing pressure equalization in at least four separate phases comprising first pressure equalizing the adsorbent bed having completed its adsorption step with a different previously purged and at least fourth higher numbered bed initially at intermediate pressure so that the two beds are finally at a first equalization pressure; second pressure equalizing the adsorbent bed initially at said first equalization pressure with a still different previously purged and at least fifth higher numbered bed initially at lower intermediate pressure so that the two beds are finally at a second equalization pressure; third pressure equalizing the adsorbent bed initially at said second equalization pressure with another previously purged and at least sixth higher numbered bed initially at still intermediate pressure so that the two beds are finally at a third equalization pressure; and fourth pressure equalizing the adsorbent bed initially at said third equalization pressure with still another previously purged and at least seventh higher numbered bed initially at lowest pressure so that the two beds are finally at a fourth equalization pressure.

23. A process according to claim 1 wherein said additional gas release for depressurization of the adsorbent bed to lowest pressure includes a countercurrent depressurization step, with the countercurrent depressurization gas discharged from the bed being recirculated and processed to recover its hydrogen content and provide same as a portion of the hydrogen in said feed gas mixture.

24. A process according to claim 1 wherein said additional gas release for depressurization of the adsorbent bed to lowest pressure includes a step of discharging gas from the adsorbent bed at a point intermediate the inlet and discharge ends of the bed, with the depressurization gas discharged from the bed being recirculated and processed to recover its hydrogen content and provide same as a portion of the hydrogen in said feed gas mixture.

25. In a process for forming a gas mixture containing hydrogen and nitrogen for ammonia synthesis, wherein a feed gas mixture containing hydrogen and adsorbable impurities is separated by selective adsorption of said impurities in each of multiple adsorbent beds by the cycle of introducing feed gas mixture to the bed inlet end at first highest superatmospheric pressure, discharging unadsorbed hydrogen-rich gas from the bed discharge end, releasing initial void space gas from the bed discharge end and introducing the so-released initial gas to the discharge end of another adsorbent bed previously purged of said impurities and initially at lower pressure until the two beds are pressure equalized at higher intermediate pressure, releasing additional gas from the bed for depressurization thereof to lowest pressure, introducing purge gas to the bed discharge end for desorption of impurities and purging through the bed inlet end, repressurizing the purged bed to said first highest superatmospheric pressure and thereafter repeating the cycle, and wherein nitrogen gas from an external source is compressed to the pressure of said discharged hydrogen-rich gas and incorporated along with said hydrogen-rich gas in said gas mixture containing hydrogen and nitrogen, the improvement comprising internally compressing said external source nitrogen gas in the bed during said cycle by introduction of external source nitrogen gas to the bed during at least one of the steps of purging and repressurization, such that at least part of the introduced nitrogen gas is retained in the bed, internally compressed to said first highest superatmospheric pressure and thereafter discharged in said unadsorbed hydrogen-rich gas, with the discharged gas forming said gas mixture containing hydrogen and nitrogen.

* * * * *